United States Patent
Levy

(10) Patent No.: US 10,515,491 B2
(45) Date of Patent: Dec. 24, 2019

(54) METHODS AND APPARATUS FOR DIAGNOSTICS OF AIRCRAFT AND OTHER MOBILE PLATFORMS

(71) Applicant: LEARJET INC., Wichita, KS (US)

(72) Inventor: Peter Fleming Levy, Augusta, KS (US)

(73) Assignee: LEARJET INC., Wichita, KS (US)

( * ) Notice: Subject to any disclaimer, the term of this patent is extended or adjusted under 35 U.S.C. 154(b) by 123 days.

(21) Appl. No.: 15/510,359

(22) PCT Filed: Sep. 9, 2015

(86) PCT No.: PCT/US2015/049125
§ 371 (c)(1),
(2) Date: Mar. 10, 2017

(87) PCT Pub. No.: WO2016/040440
PCT Pub. Date: Mar. 17, 2016

(65) Prior Publication Data
US 2017/0287239 A1    Oct. 5, 2017

Related U.S. Application Data

(60) Provisional application No. 62/049,575, filed on Sep. 12, 2014.

(51) Int. Cl.
*G07C 5/12* (2006.01)
*G07C 5/08* (2006.01)
(Continued)

(52) U.S. Cl.
CPC ........... *G07C 5/0808* (2013.01); *B64D 45/00* (2013.01); *G05B 19/0423* (2013.01);
(Continued)

(58) Field of Classification Search
CPC ....... G07C 5/0808; G06F 11/00; G06F 11/32; G06Q 10/06; G06Q 10/0635; G06Q 10/20

USPC ................. 701/31.4, 32.1; 705/305
See application file for complete search history.

(56) References Cited

U.S. PATENT DOCUMENTS 7,801,702 B2    9/2010    Berbaum et al.
7,814,369 B2    10/2010   McCroskey et al.
(Continued)

FOREIGN PATENT DOCUMENTS

EP            2266880 A1    12/2010
WO    WO-2014045397 A1 *    3/2014    ............. G07C 5/008

OTHER PUBLICATIONS

International Preliminary Report on Patentability dated Mar. 23, 2017, for International Patent Application No. PCT/US2015/049125.

(Continued)

*Primary Examiner* — Nadeem Odeh
(74) *Attorney, Agent, or Firm* — Karceski IP Law, PLLC

(57) ABSTRACT

Methods and apparatus disclosed herein may facilitate the evaluation of time-correlated operational data associated with a mobile platform more effectively by presenting the relevant data in ways that are relatively straightforward to interpret and more favorable to the identification of potential root causes. In some aspects, the methods and apparatus disclosed herein may facilitate the evaluation of multiple systems simultaneously at different points in time to study the initiation and evolution of one or more faults across one or more systems. In various embodiments, the methods and apparatus disclosed herein make use of graphic user interfaces containing synchronized elements such as two-dimensional plots, fault timelines, alert timelines and status information to facilitate diagnostics of mobile platforms.

19 Claims, 15 Drawing Sheets

(51) Int. Cl.
    *G06Q 10/00*     (2012.01)
    *G06Q 10/06*     (2012.01)
    *B64D 45/00*     (2006.01)
    *G07C 5/00*     (2006.01)
    *G05B 19/042*     (2006.01)
    *G06F 11/32*     (2006.01)
    *G06F 11/30*     (2006.01)

(52) U.S. Cl.
    CPC ........... *G06F 11/321* (2013.01); *G06Q 10/06* (2013.01); *G06Q 10/20* (2013.01); *G07C 5/008* (2013.01); *G05B 2219/23258* (2013.01); *G06F 11/3006* (2013.01)

(56) References Cited

U.S. PATENT DOCUMENTS

| | | |
|---|---|---|
| 8,386,100 B1 | 2/2013 | Lie |
| 2002/0143443 A1 | 10/2002 | Betters et al. |
| 2004/0122936 A1* | 6/2004 | Mizelle ................. G06Q 10/06 709/224 |
| 2010/0042445 A1 | 2/2010 | Nicosia |
| 2013/0073419 A1 | 3/2013 | Marwedel et al. |
| 2015/0269789 A1* | 9/2015 | Yamagata ............... G07C 5/008 701/24 |
| 2017/0278004 A1* | 9/2017 | McElhinney ............ G06N 5/04 |

OTHER PUBLICATIONS

International Search Report and Written Opinion dated Dec. 23, 2015, for International Patent Application No. PCT/US2015/049125.

\* cited by examiner

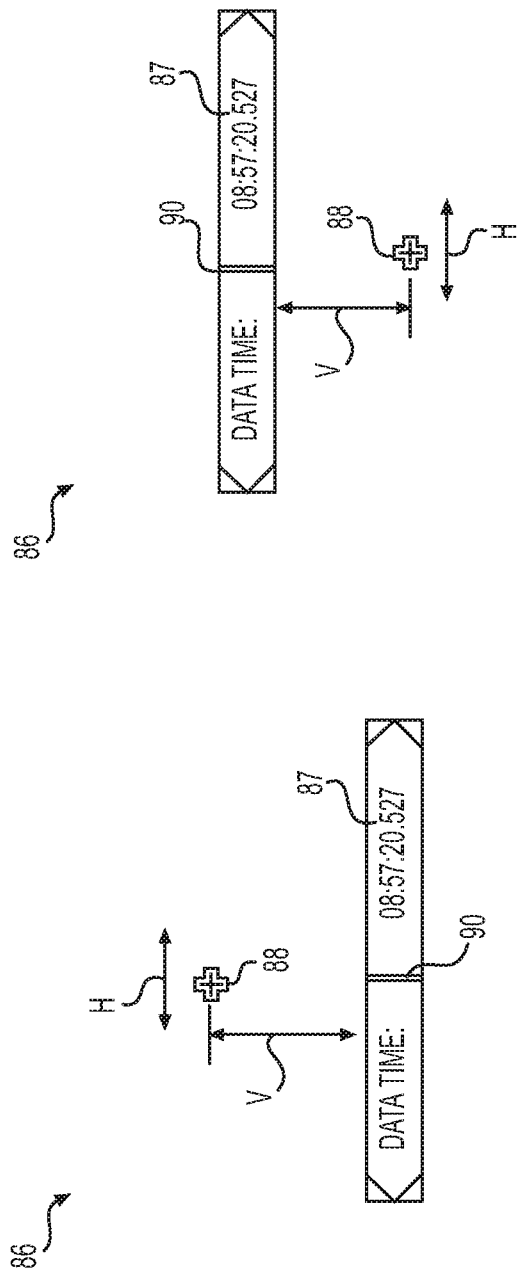

METHODS AND APPARATUS FOR DIAGNOSTICS OF AIRCRAFT AND OTHER MOBILE PLATFORMS

CROSS-REFERENCE TO RELATED APPLICATIONS

This is a National Stage Entry into the United States Patent and Trademark Office from International Patent Application No. PCT/US2015/049125, having an international filing date of Sep. 9, 2015, which application relies for priority on U.S. Provisional Patent Application Ser. No. 62/049,575, entitled "METHODS AND APPARATUS FOR DIAGNOSTICS OF AIRCRAFT AND OTHER MOBILE PLATFORMS," filed Sep. 12, 2014, the entire contents of both of which are hereby incorporated by reference.

TECHNICAL FIELD

The disclosure relates generally to diagnostics and maintenance of mobile platforms, and more particularly to methods and apparatus useful for conducting diagnostics of aircraft and other mobile platforms.

BACKGROUND OF THE ART

Some aircraft have onboard systems that can monitor the operation of some systems and that are able to detect conditions that are indicative of faults associated with such systems based on sensed parameters. Depending on the particular fault detected, troubleshooting the problem can be labour-intensive, time-consuming and costly. In some situations, the aircraft may be required to remain out of service at the maintenance facility to be available to maintenance personnel while such troubleshooting is performed.

There are existing software solutions that are used to provide assistance with diagnostics of aircraft systems based on data associated with the operation of the aircraft. However, when a problem occurs with a particular aircraft system, indications or clues relating to a root cause of a particular fault can be difficult to identify using existing solutions and there is a risk that such indications or clues be overlooked. The data obtained using existing solutions can also be difficult to interpret and therefore can still lead to relatively time-consuming and expensive diagnostics sessions.

Improvement is therefore desirable.

SUMMARY

In one aspect, the disclosure describes a computer-implemented method useful for conducting diagnostics of a mobile platform. The method comprises:
  receiving data associated with the operation of the mobile platform, the data comprising a parameter of the mobile platform correlated with time and status information of the mobile platform correlated with time;
  processing the data and generating a graphic user interface on a display device, the graphic user interface comprising a first display region showing a two-dimensional graph of the parameter plotted against a time axis and a second display region separate from the first display region;
  receiving input indicative of a time of interest along the time axis of the two-dimensional graph;
  using the status information and the time of interest along the time axis of the two-dimensional graph, identifying status information substantially synchronized with the plotted parameter at the time of interest; and
  providing the synchronized status information in the second display region separate from the first display region.

In at least one embodiment, the method comprises identifying a fault associated with the synchronized status information; and providing, in addition to the synchronized status information, an indication of the fault in the second display region.

In at least one embodiment, the method comprises: identifying a fault based on the data; and providing a fault timeline plotted against the time axis of the two-dimensional graph of the first display region indicating a time span during which the fault was active.

In at least one embodiment, the method comprises: providing, in addition to the synchronized status information, an indication of the fault in the second display region if the time of interest is within the time span during which the fault was active.

In at least one embodiment, the synchronized status information displayed in the second display region comprises a plurality of system state values; and wherein the method comprises, if the time of interest is within the time span during which the fault was active, indicating which of the system state values was/were associated with the fault at substantially the time of interest.

In at least one embodiment, the method comprises: providing a first color on the fault timeline to indicate when the fault was active and providing a second color on the fault timeline to indicate when no faults were active.

In at least one embodiment, the method comprises: identifying an active alert based on the data; and providing an alert timeline plotted against the time axis of the two-dimensional graph of the first display region indicating a time span during which the alert was active.

In at least one embodiment, the synchronized status information displayed in the second display region comprises a plurality of potential alerts; and the method comprises, if the time of interest is within the time span during which the alert was active, indicating which of the potential alerts was active at substantially the time of interest.

In at least one embodiment, the method comprises: providing a first color on the alert timeline to indicate when the alert was active and providing a second color on the alert timeline to indicate when no alerts were active.

In at least one embodiment, wherein the parameter and the synchronized status information are related to a same system of the mobile platform.

In at least one embodiment, the method comprises: providing a marker on the first display region; wherein: the input indicative of the time value of interest is based on a position of the marker; and at least part of the marker has an elongated portion extending parallel to an ordinate of the two-dimensional plot and movement of the marker is limited to movement along the time axis of the two-dimensional plot.

In another aspect, the disclosure describes an apparatus useful for conducting diagnostics of a mobile platform. The apparatus comprises:
  a display device;
  a data processor coupled to the display device; and
  computer-readable medium containing data associated with the operation of the mobile platform, the data comprising a parameter of the mobile platform correlated with time and status information of the mobile platform correlated with time, the computer-readable medium also containing instructions readable and executable by the data processor to perform a method comprising:
  processing the data and generating a graphic user interface on the display device, the graphic user interface comprising a first display region showing a two-dimensional graph of the parameter plotted against a time axis and a second display region separate from the first display region;
  receiving input indicative of a time of interest along the time axis of the two-dimensional graph;
  using the status information and the time of interest along the time axis of the two-dimensional graph, identifying status information substantially synchronized with the plotted parameter at the time of interest; and
  providing the synchronized status information in the second display region separate from the first display region.

In at least one embodiment, the method performed based on the instructions comprises identifying a fault associated with the synchronized status information; and providing, in addition to the synchronized status information, an indication of the fault in the second display region.

In at least one embodiment, the method performed based on the instructions comprises: identifying a fault based on the data; and providing a fault timeline plotted against the time axis of the two-dimensional graph of the first display region indicating a time span during which the fault was active.

In at least one embodiment, the method performed based on the instructions comprises providing, in addition to the synchronized status information, an indication of the fault in the second display region if the time of interest is within the time span during which the fault was active.

In at least one embodiment, the synchronized status information displayed in the second display region comprises a plurality of system state values; and the method performed based on the instructions comprises, if the time of interest is within the time span during which the fault was active, indicating which of the system state values was associated with the fault at substantially the time of interest.

In at least one embodiment, the method performed based on the instructions comprises providing a first color on the fault timeline to indicate when the fault was active and providing a second color on the fault timeline to indicate when no faults were active.

In at least one embodiment, the method performed based on the instructions comprises: identifying an active alert based on the data; and providing an alert timeline plotted against the time axis of the two-dimensional graph of the first display region indicating a time span during which the alert was active.

In at least one embodiment, the synchronized status information displayed in the second display region comprises a plurality of potential alerts; and the method performed based on the instructions comprises, if the time of interest is within the time span during which the alert was active, indicating which of the potential alerts was active at substantially the time of interest.

In at least one embodiment, the method performed based on the instructions comprises providing a first color on the alert timeline to indicate when the alert was active and providing a second color on the alert timeline to indicate when no alerts were active.

In at least one embodiment, the parameter and the synchronized status information are related to a same system of the mobile platform.

In at least one embodiment, the method performed based on the instructions comprises providing a marker on the first display region, wherein: the input indicative of the time value of interest is based on a position of the marker; and at least part of the marker has an elongated portion extending parallel to an ordinate of the two-dimensional plot and movement of the marker is limited to movement along the time axis of the two-dimensional plot.

In another aspect, the disclosure describes a computer-implemented method useful for conducting diagnostics of a mobile platform. The method comprises:
  receiving data associated with the operation of the mobile platform, the data comprising first status information of the mobile platform correlated with time and second status information of the mobile platform correlated with time;
  receiving input indicative of a time of interest;
  processing the data, identifying the first status information and the second status information over a period of time comprising the time of interest; and
  generating a graphic user interface on a display device, the graphic user interface comprising:
    a first timeline along which the first status information is represented over the period of time; and
    a second timeline along which the second status information is represented over the same period of time, the second timeline being juxtaposed next to the first timeline.

In at least one embodiment, the method comprises providing different colours along the first timeline to represent different values of the first status information.

In at least one embodiment, the first status information and the second status information each indicates when a fault was active.

In at least one embodiment, the first status information and the second status information each indicates when an alert was active.

In at least one embodiment, the first status information and the second status information are associated with different systems of the mobile platform.

In at least one embodiment, the method comprises the first status information indicates when a fault was active and the second status information indicates when an alert was active.

In at least one embodiment, the method comprises providing a marker indicating the time of interest on the graphic user interface, the marker superimposing the first timeline and the second timeline.

In at least one embodiment, the first status information and the second status information respectively indicate when a fault was active for a first system and a second system and the data comprises third status information of the mobile platform correlated with time and fourth status information of the mobile platform correlated with time, the third status information and the fourth status information respectively indicating when an alert was active for the first system and the second system. The method comprises: identifying the third status information and the fourth status information in the period of time comprising the time of interest; providing, in the graphic user interface, a third timeline along which the third status information is represented over the same period of time; and providing, in the graphic user interface, a fourth timeline along which the fourth status information is represented over the same period of time, the fourth timeline being juxtaposed next to the third timeline.

In at least one embodiment, the method comprises providing a first marker indicating the time of interest on the graphic user interface, the first marker superimposing the first timeline and the second timeline; providing a second marker on the graphic user interface, the second marker superimposing the third timeline and the fourth timeline; receiving input indicating movement of one of the first marker and the second marker; and causing synchronized movement of both the first marker and the second marker based on the input.

In at least one embodiment, the method comprises providing different colours along the first, second, third and fourth timelines to represent different values of the first, second, third and fourth status information respectively.

In at least one embodiment, the method comprises identifying a plurality of system state values from the data at substantially the time of interest and displaying the system state values on the graphic user interface.

In at least one embodiment, the first status information indicates when a fault was active.

In at least one embodiment, the method comprises if the position is within a time span during which the fault was active, indicating which of the system state values was associated with the fault.

In at least one embodiment, the method comprises displaying a plurality of potential alerts on the graphic user interface; and indicating which of the potential alerts was active at substantially the time of interest.

In at least one embodiment, the first status information indicates when an alert was active.

In at least one embodiment, the first status information indicates when a fault was active.

In another aspect, the disclosure describes an apparatus useful for conducting diagnostics of a mobile platform. The apparatus comprises:
  a display device;
  a data processor coupled to the display device; and
  computer-readable medium containing data associated with the operation of the mobile platform, the data comprising first status information of the mobile platform correlated with time and second status information of the mobile platform correlated with time, the computer-readable medium also containing instructions readable and executable by the data processor to perform a method comprising:
    receiving input indicative of a time of interest;
    processing the data, identifying the first status information and the second status information in a period of time comprising the time of interest; and
    generating a graphic user interface on a display device, the graphic user interface comprising:
      a first timeline along which the first status information is represented over the period of time; and
      a second timeline along which the second status information is represented over the same period of time, the second timeline being juxtaposed next to the first timeline.

In at least one embodiment, the method performed based on the instructions comprises providing different colours along the first timeline to represent different values of the first status information.

In at least one embodiment, the first status information and the second status information each indicates when a fault was active.

In at least one embodiment, the first status information and the second status information each indicates when an alert was active.

In at least one embodiment, the first status information and the second status information are associated with different systems of the mobile platform.

In at least one embodiment, the first status information indicates when a fault was active and the second status information indicates when an alert was active.

In at least one embodiment, the method performed based on the instructions comprises providing a marker indicating the time of interest on the graphic user interface, the marker superimposing the first timeline and the second timeline.

In at least one embodiment, the first status information and the second status information respectively indicate when a fault was active for a first system and a second system and the data comprises third status information of the mobile platform correlated with time and fourth status information of the mobile platform correlated with time, the third status information and the fourth status information respectively indicating when an alert was active for the first system and the second system. The method performed based on the instructions comprises: identifying the third status information and the fourth status information over the period of time comprising the time of interest; providing, in the graphic user interface, a third timeline along which the third status information is represented over the same period of time; and providing, in the graphic user interface, a fourth timeline along which the fourth status information is represented over the same period of time, the fourth timeline being juxtaposed next to the third timeline.

In at least one embodiment, the method performed based on the instructions comprises: providing a first marker indicating the time of interest on the graphic user interface, the first marker superimposing the first timeline and the second timeline; providing a second marker on the graphic user interface, the second marker superimposing the third timeline and the fourth timeline; receiving input indicating movement of one of the first marker and the second marker; and causing synchronized movement of both the first marker and the second marker based on the input.

In at least one embodiment, the method performed based on the instructions comprises providing different colours along the first, second, third and fourth timelines to represent different values of the first, second, third and fourth status information respectively.

In at least one embodiment, the method performed based on the instructions comprises identifying a plurality of system state values from the data at substantially the time of interest and displaying the system state values on the graphic user interface.

In at least one embodiment, the first status information indicates when a fault was active.

In at least one embodiment, the method performed based on the instructions comprises, if the position is within a time span during which the fault was active, indicating which of the system state values was associated with the fault.

In at least one embodiment, the method performed based on the instructions comprises: displaying a plurality of potential alerts on the graphic user interface; and indicating which of the potential alerts was active at substantially the time of interest.

In at least one embodiment, the first status information indicates when an alert was active.

In at least one embodiment, the first status information indicates when a fault was active.

In another aspect, the disclosure describes a computer program product comprising a non-transitory computer readable storage medium having program code embodied therewith, the program code readable/executable by a computer, processor or logic circuit to perform any one of the methods disclosed herein or part(s) thereof.

Further details of these and other aspects of the subject matter of this application will be apparent from the detailed description and drawings included below.

DESCRIPTION OF THE DRAWINGS

Reference is now made to the accompanying drawings, in which:

FIGS. 14A and 14B illustrate the function of a time selector used in one or more of the graphic user interfaces described herein.

DETAILED DESCRIPTION

Aspects of various embodiments are described through reference to the drawings.

The present disclosure relates to diagnostics and maintenance of systems such as mobile platforms. Aspects of the present disclosure may be useful in performing diagnostics of relatively complex systems which may include a plurality of cooperating subsystems. In various aspects, the present disclosure relates to improving the efficiency of diagnostics of mobile platforms by facilitating the identification of potential root causes for faults that are encountered on such mobile platforms. In some aspects, the methods and apparatus disclosed herein may permit diagnostics personnel to navigate through and evaluate time-correlated operational data associated with a mobile platform more effectively by presenting the relevant data in ways that are relatively straightforward to interpret and more favorable to the identification of potential root causes. In some aspects, the methods and apparatus disclosed herein may permit diagnostics personnel to examine the operation of multiple (e.g., including complex and interacting) systems simultaneously at different points in time to more effectively study the initiation and evolution of one or more faults. In some aspects, the methods and apparatus disclosed herein may, for example, permit diagnostics personnel to effectively examine the inter-relations between faults across multiple systems of a mobile platform and more efficiently identify root causes.

The present disclosure discloses onboard apparatus and methods and also ground-based apparatus and methods that may cooperate in assisting with the maintenance of mobile platforms by facilitating diagnosis of faults detected onboard mobile platforms while such mobile platforms are in operation (e.g., in real-time while the mobile platform is in transit or flight) and thereby permit the planning of required maintenance (e.g., obtaining replacement parts, alerting maintenance personnel) even before the mobile platform has landed or has otherwise returned to a maintenance facility. Alternatively, the apparatus and methods disclosed herein may be used to conduct diagnostics offline and/or after the mobile platform has returned to the maintenance facility.

In some embodiments, aspects of the present disclosure may contribute toward reduced diagnostics time, maintenance time, maintenance costs and the overall operating cost of such mobile platform. Even though the present disclosure mainly makes reference to aircraft as an exemplary mobile platform, aspects of the present disclosure could apply to other types of mobile platforms such as trains, busses, watercraft (e.g., ships), spacecraft, trucks, automobiles and other types of vehicles.

Figure 1:
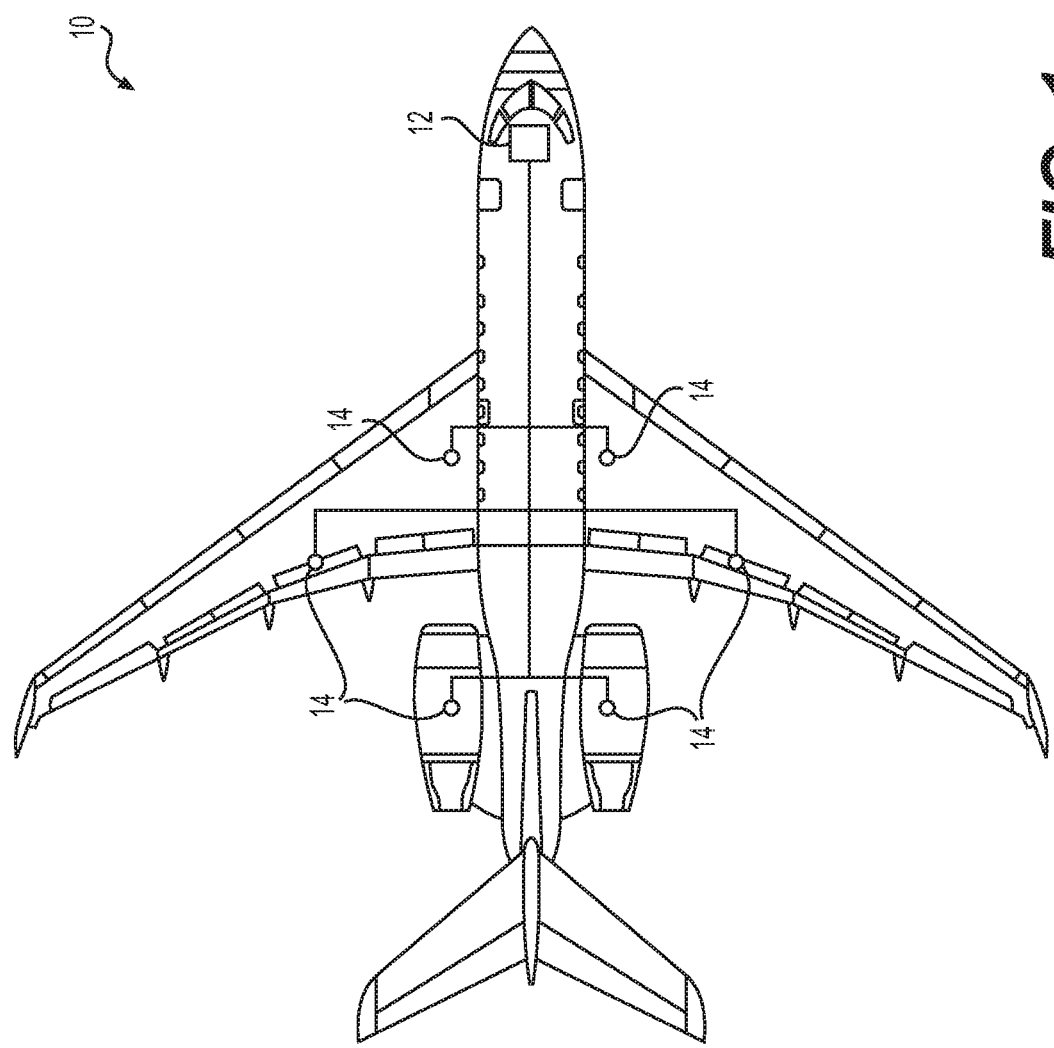
FIG. 1 is a top plan view of an exemplary aircraft comprising an exemplary onboard apparatus for monitoring the operation of one or more systems of the aircraft.

FIG. 1 is a top plan view of an exemplary aircraft 10 with which various aspects of the present disclosure may be used. Aircraft 10 may include, for example, any suitable aircraft such as corporate, private, commercial or any other type of aircraft including fixed-wing and rotary-wing aircraft. Aircraft 10 may, for example, be a narrow-body, twin engine jet airliner. FIG. 1 also shows onboard apparatus 12 for monitoring the operation of one or more systems 16 (shown schematically in FIG. 2) of aircraft 10. Onboard apparatus 12 may also be used to detect events such as faults onboard aircraft 10. Onboard apparatus 12 may be coupled to one or more sensors 14 associated with the one or more systems 16 of aircraft 10. Onboard apparatus 12 and sensors 14 are shown schematically in FIG. 1 and are shown as being superimposed over aircraft 10 for illustration purpose only.

Onboard apparatus 12 may be coupled to sensors 14 via wired or wireless connections. The one or more systems 16 coupled to onboard apparatus 12 may be located in different areas of aircraft 10. Systems 16 may include any monitored system 16 of aircraft 10 and aspects of the present disclosure are not intended to be limited to the specific systems 16 disclosed herein. By way of non-limiting examples, such systems 16 may include fuel tanks and fuel delivery systems, landing gear, avionics equipment, flight control computers, engines, power generators, flight control surfaces, actuators, hydraulic pumps, water tanks, in-flight entertainment systems, pressurization systems, doors, lavatories, and various line replaceable units (LRUs).

Onboard apparatus 12 may be configured to detect one or more faults associated with one or more of systems 16. The detection of such faults may be based on logic rules (e.g., thresholds) stored in memory 26 for sensed parameters or system state values associated with the one or more systems 16. Accordingly, onboard apparatus 12 may be configured to monitor one or more systems 16 of aircraft 10 and detect such faults. A fault may, for example, include an indication of degraded performance, a non-normal operating condition, a failure condition, a precursor to a failure condition or any other condition that may require attention, further investigation, maintenance or other action.

Figure 2:
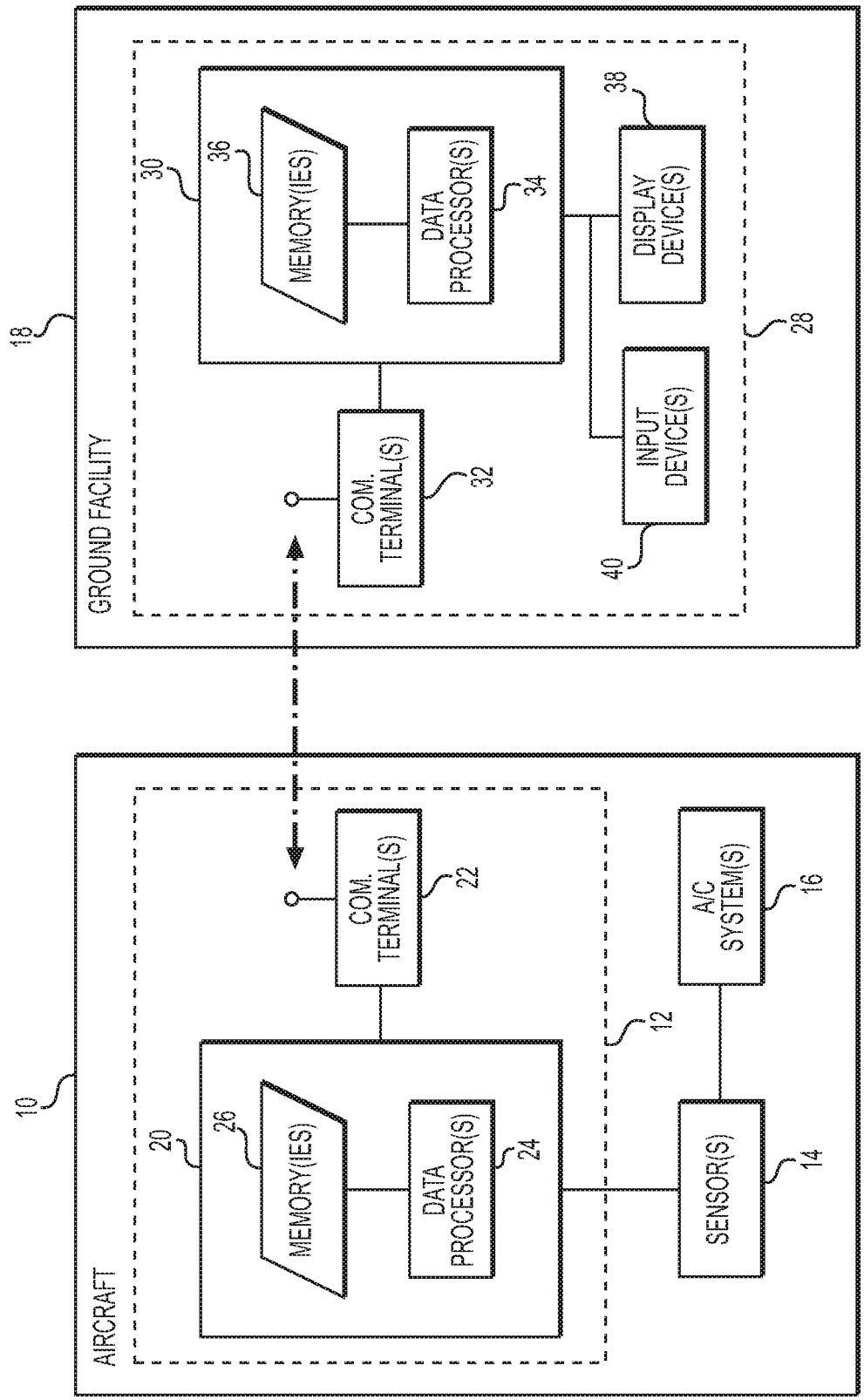
FIG. 2 shows a schematic representation of the aircraft of FIG. 1 and a schematic representation of an exemplary ground facility comprising an apparatus useful in conducting diagnostics of the aircraft of FIG. 1.

FIG. 2 shows a schematic representation of aircraft 10 and also a schematic representation of ground facility 18. Onboard apparatus 12 of aircraft 10 may comprise one or more health monitoring units 20 (referred hereinafter as "HMU 20") and one or more communication terminals 22 for receiving messages (i.e., signals) and for transmitting messages (i.e., signals) from aircraft 10. HMU 20 may be coupled to terminal 22 and also coupled to one or more monitored systems 16 of aircraft 10. HMU 20 may comprise one or more data processors 24 (referred hereinafter as "processor 24") and computer-readable memory(ies)/medium(ia) (referred hereinafter as "memory 26") containing instructions readable and executable by processor 24. HMU 20 may handle the monitoring, recording and/or offloading of data related to aircraft 10.

Data relating to the operation of aircraft 10 may be acquired via HMU 20 and stored in memory 26. Such data may include one or more (e.g., sensed and/or calculated) parameters and/or status information associated with one or more systems 16 of aircraft 10. Such status information may include one or more of: system state values (e.g., operational states including those commonly known as "discretes"); indication of whether or not one or more faults were active; and indication of whether or not one or more alerts were active. The data may be correlated with time and therefore permit the reconstruction of one or more at least partial system states at different times of operation of aircraft 10.

Such alerts may include messages communicated to an operator of the mobile platform such as a pilot of aircraft 10. For example, such alerts may include any type of indication produced by a crew alerting system, sometimes referred as "CAS message", of aircraft 10. For example, an alert may comprise one or more of: an illumination of an indicator light; an aural alert; and/or a textual message. An alert may also have an associated level of importance such as "WARNING", "CAUTION" and "ADVISORY" depending on the nature of the alert.

Ground facility 18 may comprise a single facility or a combination of two or more facilities. For example, ground facility 18 may include the facility of one or more of: a manufacturer of aircraft 10, a manufacturer of one or more systems 16 (e.g., engine) of aircraft 10, an operator of aircraft 10, a maintenance provider for any part of aircraft 10, a data service provider and/or any other authorised party involved in the health monitoring, operation and/or maintenance of aircraft 10. Ground facility 18 may comprise a combination of two or more facilities that may be located remotely from each other and between which data transfer may be conducted via known or other means. Ground facility 18 may comprise ground-based apparatus 28 which may also assist with maintenance of aircraft 10. Ground-based apparatus 28 may comprise one or more computers 30 (referred hereinafter as "computer 30"), which may be coupled to one or more optional communication terminals 32. Terminal 32 may be configured to receive data (i.e., signals) associated with the operation of aircraft 10 and/or for transmitting data (i.e., signals) to aircraft 10.

Ground-based apparatus 28 may comprise one or more data processors 34 (referred hereinafter as "processor 34") and one or more computer-readable memory(ies)/medium(ia) 36 (referred hereinafter as "memory 36") containing instructions readable and executable by processor 34. Ground-based apparatus 28 may also comprise one or more display devices 38 (referred hereinafter as "display 38") coupled to computer 30 to permit communication of information to a user (e.g., diagnostics personnel) of ground-based apparatus 28 via suitable graphic user interface (GUI) explained further below. While display 38 may be used to visually communicate information to a user, other forms of output signal(s) (e.g., auditory) may be used instead of or in addition to display 38. Display 38 may, for example, include one or more cathode-ray tubes (CRTs), liquid crystal displays (LCDs), plasma displays, light-emitting diode (LED) based displays or any known or other suitable type of display device(s). Display 38 may be part of a portable electronic device such as a smart phone, tablet computer and/or laptop computer which may be in communication with computer 30 or may comprise computer 30.

Display 38 may also provide means for ground-based apparatus 28 to receive input from a user. For example, display 38 may provide a touch-sensitive surface and a corresponding GUI that permits user input. Other user input devices 40 such as, for example, a keyboard, mouse or voice-based input means may be provided.

Processors 24 and 34 may, for example, each comprise or be part of one or more digital computer(s) or other data processors or other suitably programmed or programmable logic circuits. Processors 24 and 34 may comprise general purpose computer(s), special purpose computer(s), or other programmable data processing apparatus. Processor 24 may be configured for use onboard aircraft 10.

Memories 26 and 36 may comprise any combination of one or more suitable computer readable medium(ia). The computer readable medium may be a non-transitory computer readable storage medium. Such non-transitory computer readable storage medium may comprise, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer-readable storage medium may be any tangible medium that can contain or store data including instructions for use by or in connection with an instruction execution system, apparatus, or device such as processors 24 and 34.

Various aspects of the present disclosure may be embodied as systems, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memories 26 and/or 36) having computer readable program code (e.g., instructions) embodied thereon. The computer program product may, for example, be executable by data processors 24 and/or 34 or other suitable logic circuit to cause the execution of one or more of the methods disclosed in the present disclosure in entirety or in part.

Computer program code for carrying out operations for aspects of the present disclosure in accordance with instructions stored in memories 26 and or 36 may be written in any combination of one or more programming languages, including an object-oriented programming language such as Java, Smalltalk, C++ or the like and conventional procedural programming languages, such as the "C" programming language or other programming languages.

Terminals 22 and 32 may be configured to permit communication between aircraft 10 and ground-facility 18 via known or other communication methods and protocols. Accordingly, additional intermediate components (not shown) may be required to establish communication between terminals 22 and 32. Communication between aircraft 10 and ground facility 18 may, for example, be achieved via SATCOM, cellular communication, WiFi, or any other wireless or wired connection(s). Communication between terminals 22 and 32 may be conducted during or after operation of aircraft 10. Instead of using terminals 22 and 32, data from aircraft 10 could be transferred to computer 30 via one or more wired connections or could be transferred to computer 30 manually using a portable data storage device.

Various tasks and methods performed using ground-based apparatus 28 are described below. However, some tasks and methods said to be performed by ground-based apparatus 28 could be performed by onboard apparatus 12.

Figure 3:
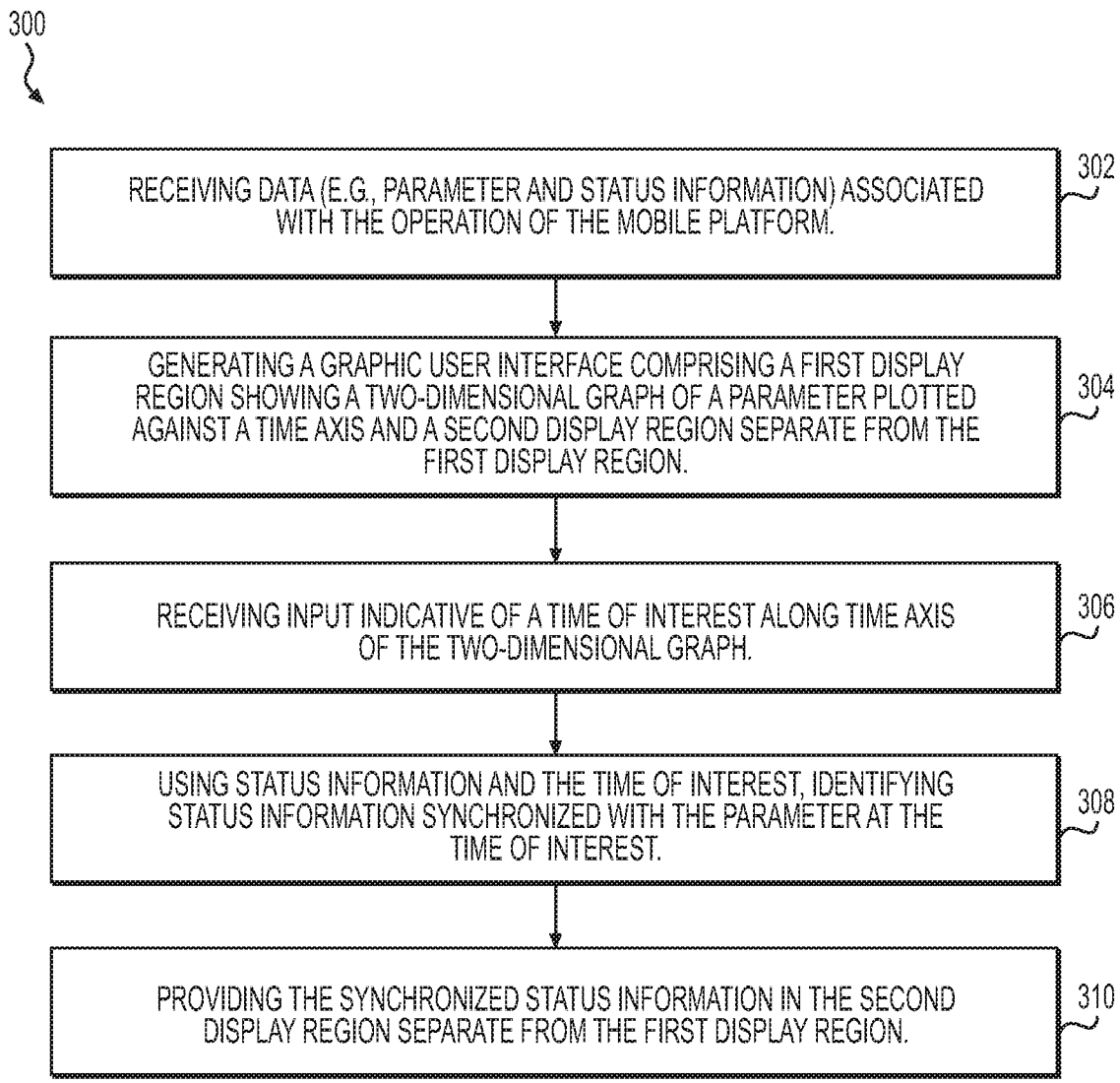
FIG. 3 is a flowchart of an exemplary method useful in conducting diagnostics of the aircraft if FIG. 1.

FIG. 3 is a flowchart of an exemplary method 300 useful in diagnostics of a mobile platform such as aircraft 10.

Figure 4:
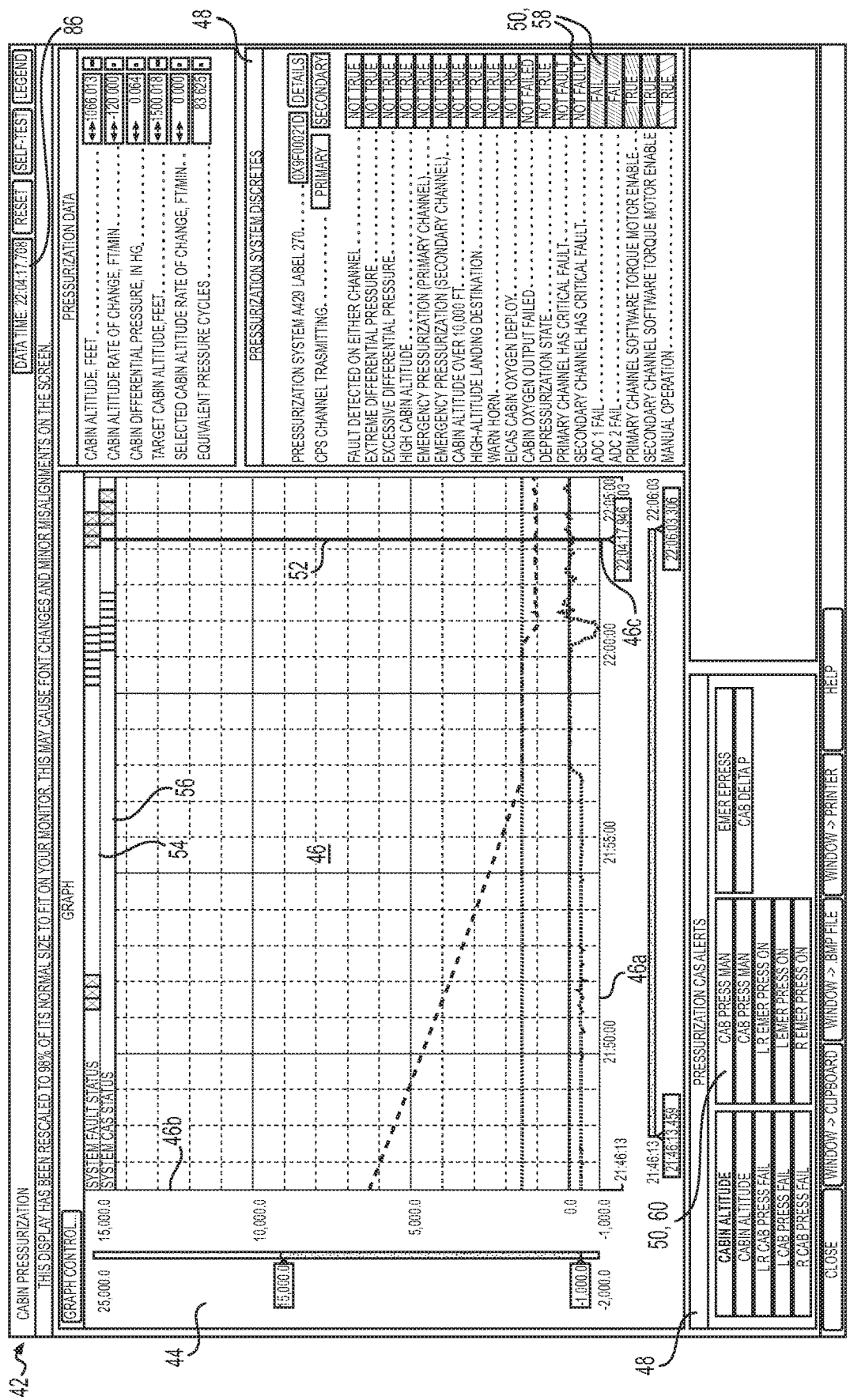
FIG. 4 shows an exemplary graphic user interface that may be generated using the method of FIG. 3.

FIG. 4 shows an exemplary GUI 42 that may be generated on display 38 using apparatus 28 and method 300.

In reference to FIGS. 3 and 4, method 300 or part(s) thereof may be computer-implemented and may be performed using apparatus 28 based on instructions stored in memory 36. Method 300 or parts thereof may be performed while aircraft 10 is in operation (e.g., in flight) or afterwards. In various embodiments, method 300 may comprise receiving data relating to the operation of aircraft 10 (see block 302). The data may comprise one or more parameters of aircraft 10 correlated with time and status information 50 of aircraft 10 correlated with time. Method 300 may comprise processing the data and generating GUI 42 on display 38 (see block 304). GUI 42 may comprise first display region 44 (see FIG. 4) showing two-dimensional graph 46 of one or more parameters plotted against time axis 46A and second display region 48 separate from first display region 44. In some embodiments, second display region 48 may be separate from first display region 44 so as to not obstruct or overlap with any part of two-dimensional graph 46. Status information 50 may be displayed in second display region 48 separate from first display region 44. Status information 50 displayed in second display region 48 may be related to the same or to different system(s) 16 than the system(s) 16 to which the one or more parameters plotted in first display region 44 are related.

Method 300 may also comprise receiving input indicative of time of interest 46C along time axis 46A of two-dimensional graph 46 (see block 306). Method 300 may also comprise using the status information and time of interest 46C along time axis 46A of two-dimensional graph 46, identifying status information 50 substantially synchronized with the graphed parameter(s) at time of interest 46C (see block 308). Method 300 may also comprise providing synchronized status information 50 in second display region 48 separate from first display region 44. The parameter and synchronized status information 50 may be related to the same system or to different systems of aircraft 10. In FIG. 4, for example, the parameter and synchronized status information 50 are related to a cabin pressurization system 16 of aircraft 10.

Time of interest 46C may be used to synchronize information across display regions other than first display region 44 and second display region 48. For example, GUI 42 may comprise additional display regions in which synchronized status information 50 or other information may be displayed. For example, a user of apparatus 28 may have one or more additional windows open on display device(s) 38 to display one or more additional display regions where at least some of the information displayed in the additional display region(s) may be substantially synchronized based on time of interest 46C. The information displayed in the additional display region(s) may be related to the same or to one or more different systems 16 than the system(s) 16 to which the parameter(s) of graph 46 may be related. For example, displaying synchronized status information 50 about different systems 16 may show how different systems 16 were behaving at the same time and facilitate diagnostics.

The data relating to the operation of aircraft 10 may comprise a data set comprising data values and corresponding time values. In the context of the present disclosure, the synchronization of one or more parameters with status information may not be absolute but may be approximate in case where the time values associated with the one or more parameters do not match exactly with the time values of the status information in the data set. Similarly, the identification of any values identified or referenced herein as corresponding to a specific time of interest may comprise looking-up values at the nearest corresponding time value in the data set. Alternatively, the values identified or referenced herein as corresponding to a specific time of interest may be interpolated between two values in the data set if appropriate.

At block 306, the input indicative of time of interest 46C along time axis 46A of two-dimensional graph 46 may be received from a user via input device 40. Alternatively, apparatus 28 may be configured to automatically identify a time of interest 46C based on the parameter that is plotted on two-dimensional graph 46. In various embodiments, GUI 42 may comprise marker 52, which may be used to indicate time of interest 46C. Marker 52 may be movable and movement of marker 52 may be controlled by the user of apparatus 28 via input device 40. Movement of marker 52 may be limited to first display region 44. At least part of marker 52 may comprise a generally elongated portion (e.g. a line) extending along ordinate 46B of two-dimensional plot 46 and movement of marker 52 may be limited to movement along time axis 46A (i.e., abscissa) of two-dimensional plot 46.

As explained above, the status information from aircraft 10 may comprise information about faults detected by onboard apparatus 12 and also information about the activation of alerts onboard aircraft 10. Accordingly, method 300 may comprise identifying one or more faults based on the status information. In some embodiments, method 300 may also comprise identifying the activation of one or more alerts associated with the status information.

Using the fault information, method 300 may comprise providing one or more fault timelines 54 plotted against time axis 46A of two-dimensional graph 46 of first display region 44. Fault timeline 54 may indicate a time span in relation to time axis 46A during which one or more faults were active. Similarly, using the alert information, method 300 may comprise providing one or more alert timelines 56 plotted against time axis 46A of two-dimensions graph 46 of first display region 44. Alert timeline 56 may indicate a time span in relation to time axis 46A during which one or more alerts were active.

Fault timeline 54 and/or alert timeline 56 may be provided in any suitable portion of first display region 44. For example, fault timeline 54 and/or alert timeline 56 may be juxtaposed next to each other. For the purpose of the present disclosure, references made to timelines being "juxtaposed" is intended to encompass situations where the timelines are positioned immediately next to each other and also situations where the timelines are spaced apart from each other but still displayed simultaneously on display 38 so as to permit a visual comparison of the timelines to be made when they are displayed to a user.

Fault timeline 54 and/or alert timeline 56 may each have a linear shape and be oriented substantially parallel to time axis 46A of two-dimensional graph 46. In some embodiments, fault timeline 54 and/or alert timeline 56 may be positioned at or near an upper portion of two-dimensional graph 46 so as to not significantly obstruct the plot of the parameter on two-dimensional graph 46. Fault timelines 54 and/or alert timelines 56 may comprise different colors to indicate different status information. For example, a first color (e.g., red, yellow or white) on fault timeline 54 may indicate an active fault and a second color (e.g., green) on fault timeline 54 may indicate no active faults. Similarly a first color (e.g., red, yellow or white) on alert timeline 56 may indicate an active alert and a second color (e.g., green) on alert timeline 56 may indicate no active alerts. The different colors such as red, yellow or white may be used to provide an indication of the type or importance of the fault or alert. For example, for the purpose of alert timeline 56, a red portion may indicate a time span during which a "WARNING" type of alert was active, a yellow portion may indicate a time span during which a "CAUTION" type of alert was active, a white portion may indicate a time span during which an "ADVISORY" type alert was active and a green portion may indicate a time span during which no alerts were active. For the purpose of illustration in the figures of the present disclosure, portions of different fill patterns are shown on fault timeline 54 and alert timeline 56 to represent different colors. In cases where there may be more than one fault or alert active simultaneously, the color indicated on the respective timeline 54, 56 may be that associated with the most important or critical fault or alert.

As described above, movement of marker 52 along time axis 46A may be controlled by a user (e.g., diagnostics personnel) via input device 40 and such input may be used to cause status information 50 displayed in second display region 48 to be updated such that it is substantially synchronized with the time of interest 46C indicated by marker 52. Alternatively or in addition, such input may comprise a numerical value representative of time of interest 46C without user-controlled movement of marker 52. Synchronized status information 50 may comprise system state values 58 which may be synchronized with the value of the parameter plotted in two-dimensional graph 46 at substantially time of interest 46C (e.g., as indicated by marker 52). If time of interest 46C is within a time span during which a fault was active or an alert was active, an indication may be provided as to which of the system state values 58 is/are associated with either the fault or with the alert. For example, as shown in FIG. 4, system state values 58 may be labelled as "Fail" or "Not Fault" and/or may be displayed in different colors (e.g., red, yellow and white) to provide such indication(s). Such indication(s) may be synchronized with the time of interest 46C indicated by marker 52.

Synchronized status information 50 may instead or in addition comprise an indication of active alerts 60 which may be synchronized with the value of the parameter(s) plotted in two-dimensional graph 46 at substantially time of interest 46C indicated by marker 52. If time of interest 46C is within a time span during which an alert was active, an indication may be provided as to which alert was active at substantially time of interest 46C. For example, as shown in FIG. 4, a list of potential alerts may be shown where only active alert(s) 60 may be indicated as such by way of highlighting. In FIG. 4, only one of the "CAB PRESS MAN" alert is highlighted (i.e., bold letters) and therefor indicated as active at time of interest 46C while the other alerts displayed in the list of potential alerts are not highlighted (i.e., dim letters). The alerts displayed in the list of potential alerts may be presented in different colors to indicate the type or importance of the corresponding alert as explained above.

The parameter and synchronized status information 50 may be related to the same system 16 of aircraft 10 or to different systems of aircraft 10. In FIG. 4 for example, the parameter plotted in two-dimensional graph 46 is the cabin altitude in feet and the synchronized status information 50 comprises system state values 58 and active alert 60 related to a cabin pressurization system of aircraft 10.

Figure 5A:
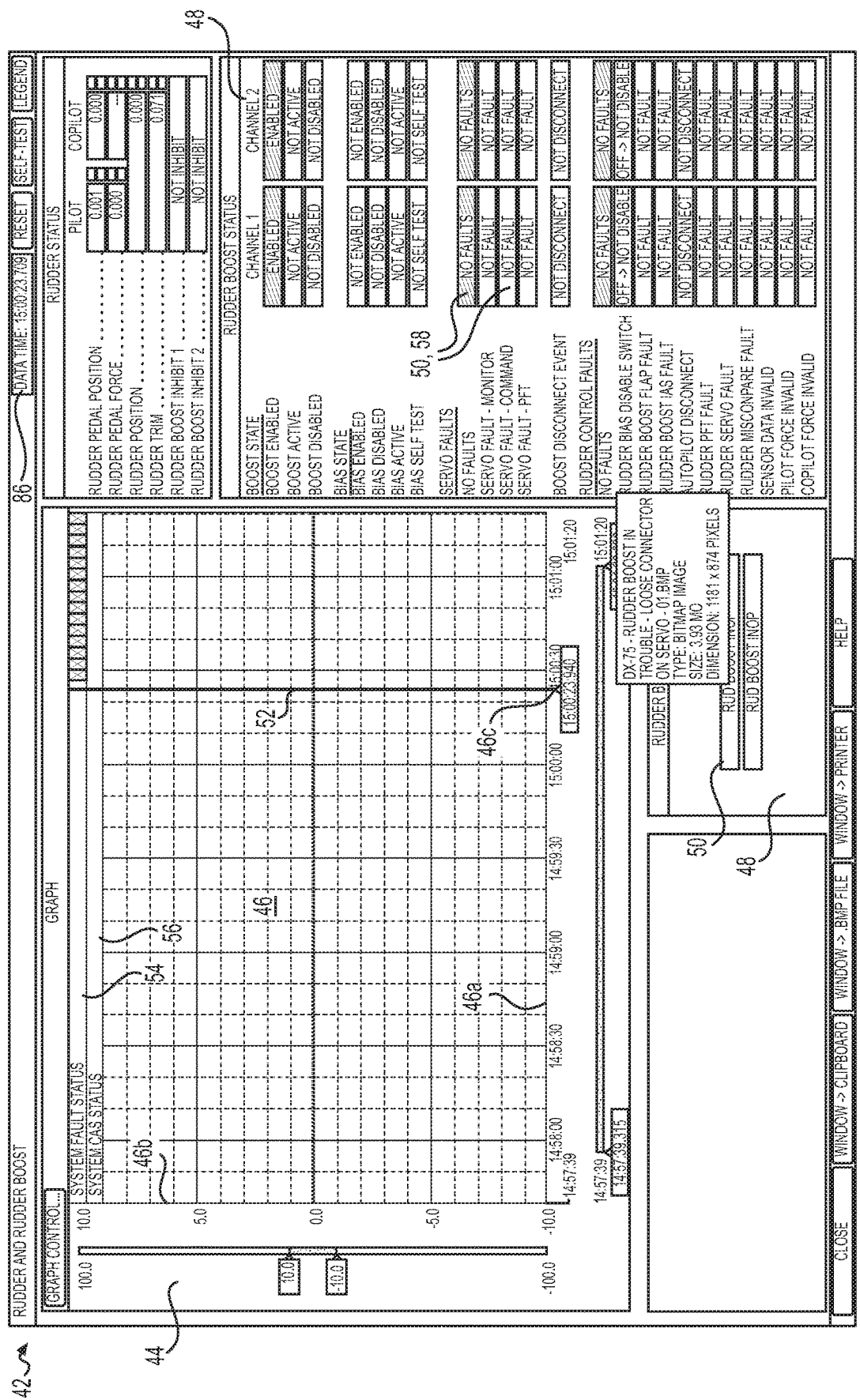
FIGS. 5A and 5B show another graphic user interface that may be generated using the method of FIG. 3 where a position of a marker in FIG. 5A indicates a time when no faults were active and the position of the marker in FIG. 5B indicates a time when a fault was active.
Figure 5B:
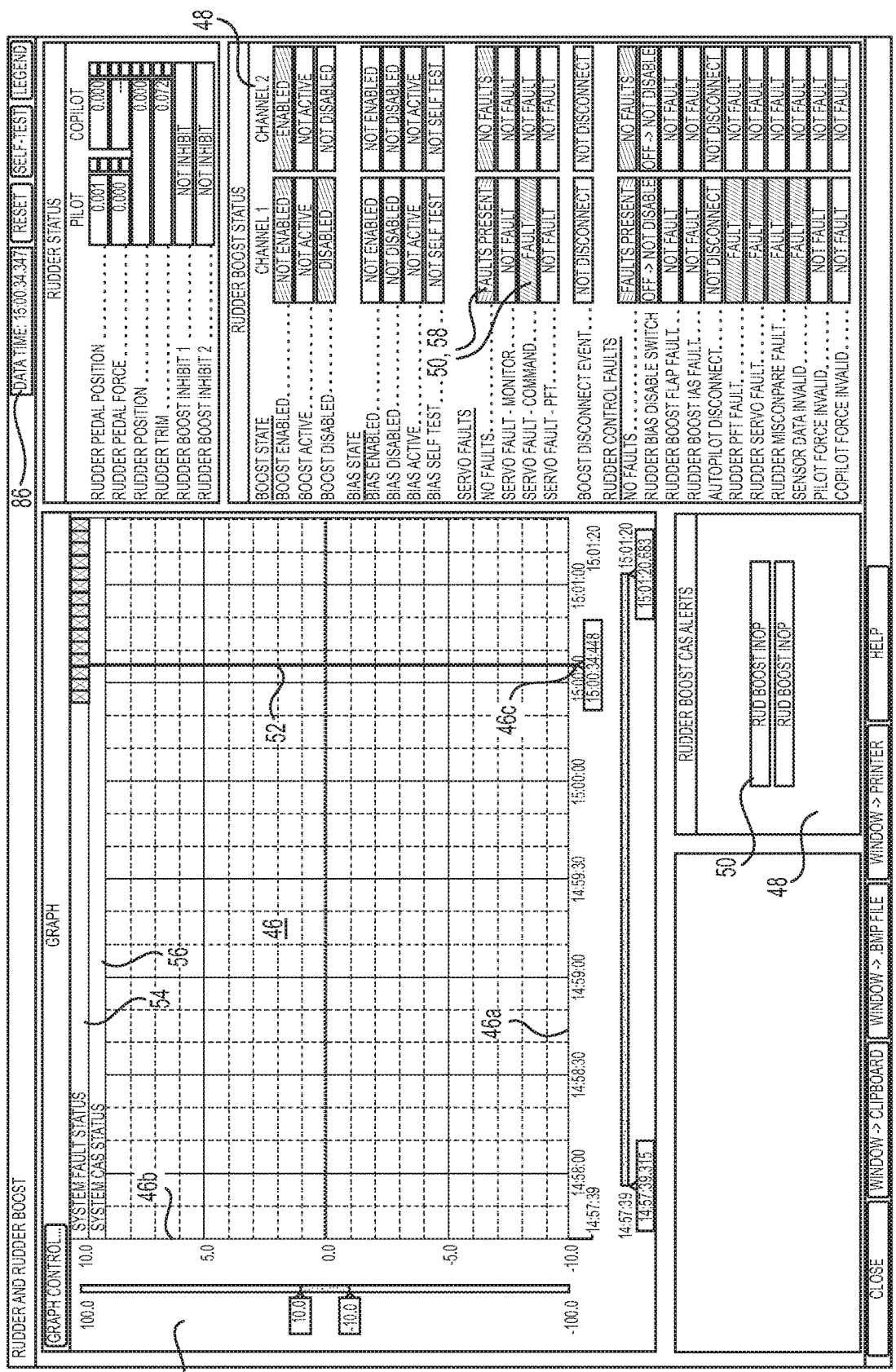

FIGS. 5A and 5B show another example of GUI 42 relating to a rudder system 16 of aircraft 10. In FIG. 5A, the position of marker 52 indicates time of interest 46C at which no faults were active as indicated by fault timeline 54. In FIG. 5B, the position of marker 52 indicates time of interest 46C where at least one fault was active as indicated by fault timeline 54. Accordingly, FIGS. 5A and 5B show the effect on synchronized status information 50 of moving marker 52 from a position before a fault occurred to another position when the fault was active. FIGS. 5A and 5B also show the effect on the parameter plotted in two-dimension graph 46 of moving marker 52 from the position before the fault occurred to the other position when the fault was active. For example, FIG. 5B provides a number of fault indications associated with specific system state values 58 displayed in second region 48. Such fault indications may indicate potential root causes for the associated fault. As shown in FIGS. 5A and 5B, GUI 42 allows the state of a system 16 of aircraft 16 to be virtually re-constructed at different times of interest 46C and can facilitate a relatively efficient diagnostics session. GUI 62 of FIGS. 5A and 5B may provide an effective visual correlation of a parameter with active alerts 60 and/or system state values 58 and may, in some cases significantly reduce the time needed to conduct diagnostics of aircraft 10 in comparison with existing diagnostics methods. The use of marker 52 to change time of interest 46C may permit a user to move back and forth in time and visualize the synchronized information.

Figure 6:
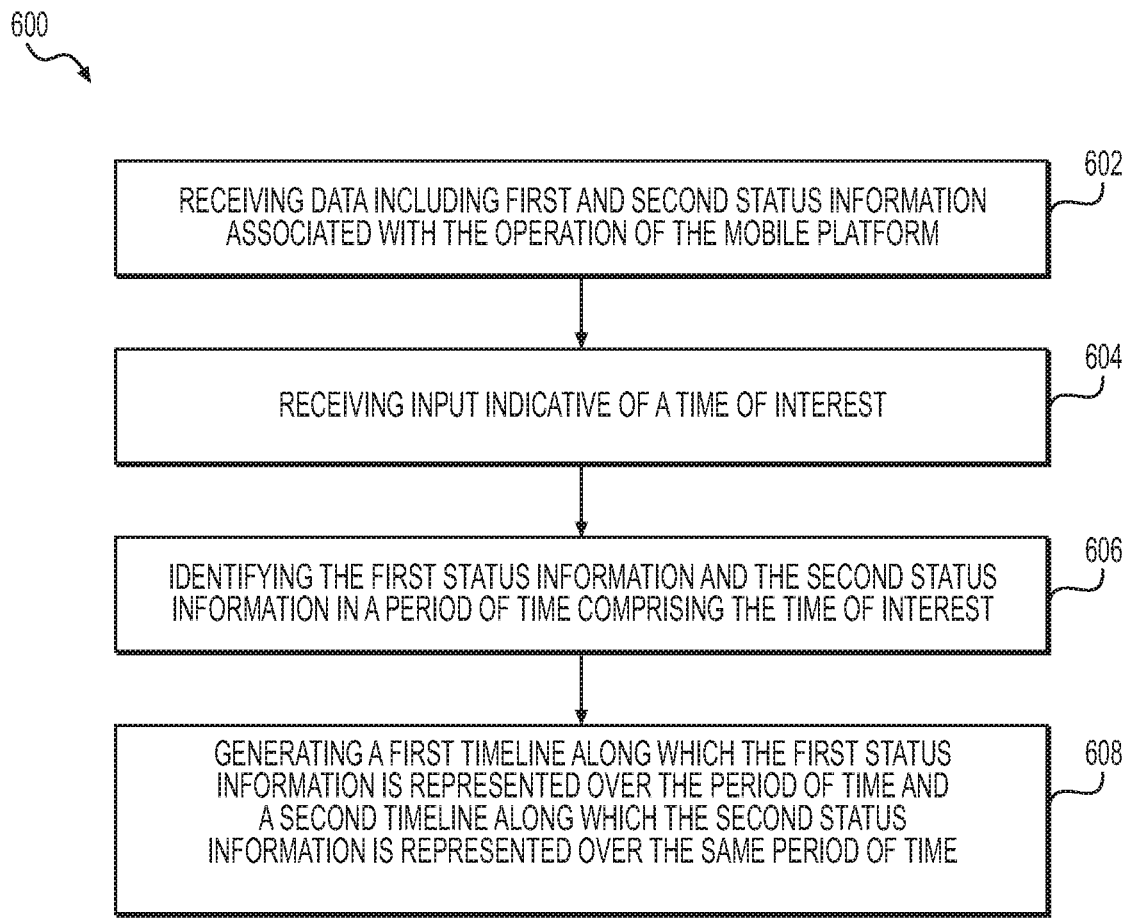
FIG. 6 is a flowchart of another exemplary method useful in conducting diagnostics of the aircraft if FIG. 1.

FIG. 6 is a flowchart of another exemplary method 600 useful in diagnostics of a mobile platform such as aircraft 10.

FIGS. 7-13 shows exemplary GUIs 62 that may be generated on display 38 using apparatus 28 and method 600. In reference to FIGS. 6 and 7, method 600 or part(s) thereof may be computer-implemented and may be performed using apparatus 28 based on instructions stored in memory 36. Method 600 or parts thereof may be performed while aircraft 10 is in operation (e.g., in flight) or afterwards. Method 600 may be related to and performed in conjunction and in cooperation with other methods disclosed herein. Method 600 or part(s) thereof may be combined with part(s) of other methods disclosed herein. Some aspects of method 300 may also apply to method 600 and therefore some description provided above in relation to method 300 will not be repeated.

Figure 7:
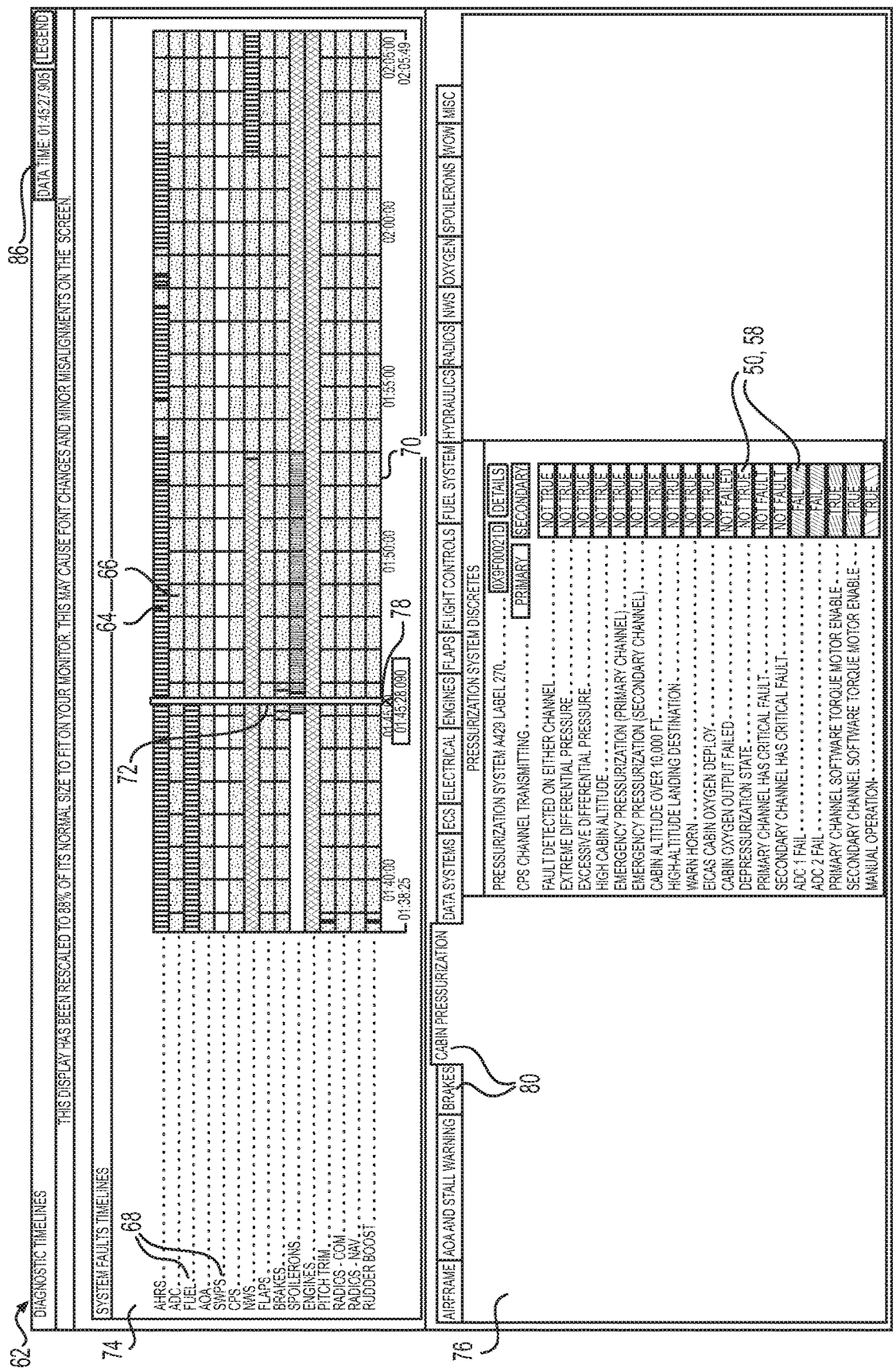
FIGS. 7-13 show exemplary graphic user interfaces that may be generated using the method of FIG. 6.

In various embodiments, method 600 may comprise receiving data associated with the operation of aircraft 10 (see block 602). The data may comprise first status information associated with aircraft 10 correlated with time and second status information associated with aircraft 20 correlated with time. Method 600 may comprise receiving input indicative of time of interest 78 indicated by marker 72 (see block 604). Method 600 may comprise processing the data and identifying the first status information and the second status information in a period of time comprising time of interest 78 (see block 606). Method 600 may also comprise generating GUI 62 on display 38. GUI 62 may comprise: first timeline 64 along which the first status information may be represented over the period of time; and second timeline 66 along which the second status information may be represented over the same period of time (see block 608). Second timeline 66 may be juxtaposed next to first timeline 64 for the purpose of visual comparison. As shown in FIG. 7, one or more additional timelines based on one or more additional status information may be provided in GUI 62. Timelines 64 and 66 may have a linear shape.

The function and behavior of timelines 64 and 66 may be similar or identical to the function and behavior of timelines 54 and 56 described above in relation to GUI 42. For example, different colours may be provided along first timeline 64 and/or second timeline 66 to represent different values of the first status information and the second status information respectively.

In some embodiments, the first status information and the second status information and hence first timeline 64 and second timeline 66 may respectively indicate when a fault was active. In some embodiments, the first status information and the second status information and hence first timeline 64 and second timeline 66 may respectively indicate when an alert was active. In some embodiments, the first status information and first timeline 64 may indicate when a fault was active and the second status information and second timeline 66 may indicate when an alert was active. In various embodiments, the first status information and the second status information and hence first timeline 64 and second timeline 66 may be associated with different systems 16 of aircraft 10. Label 68 indicating the relevant system 16 may be provided on GUI 62 for each timeline 64, 66.

Timelines 64, 66 may be plotted against a common time axis 70. Marker 72 may be provided on GUI 62. The function and behavior of marker 72 may be similar or identical to those of marker 52 in relation to GUI 42 of FIGS. 4 to 5B. For example, marker 72 may have an elongated (e.g., linear) shape that superimposes first timeline 64 and second timeline 66.

Movement of marker 72 may be controlled via input device 40. In some embodiments, movement of marker 72 may be limited to movement along time axis 70.

Timelines 64, 66 may be provided in first display region 74 of GUI 62. GUI 62 may comprise second display region 76 separate from first display region 74 so that second display region 76 does not overlap first display region 74. Second display region 76 may serve to display synchronized status information 50 based on the position of marker 72. For example, method 600 may comprise receiving input indicating a position along first timeline 64 and/or second timeline 66. The position of marker 72 may represent a time of interest 78 along first timeline 64 and/or second timeline 66. Method 600 may comprise identifying a plurality of system state values 58 from the data associated with the operation of aircraft 10 and displaying system state values 58 in second display region 76 of GUI 62. System state values 58 may be associated with different systems 16 of aircraft 10. Accordingly, second display region 76 may comprise tabs 80 permitting a user to select of which particular system 16 system state values 58 should be displayed. Alternatively, other known or other selection means could be provided to permit the simultaneous display of system state values 58 of two or more different systems 16.

System state values 58 displayed in GUI 62 may be synchronized with the status information represented in first timeline 64 and/or second timeline 66 based on the position along first timeline 64 and/or second timeline 66 indicated by marker 72. In some embodiments where first timeline 64 and/or second timeline 66 indicate time spans during which one or more faults were active, method 600 may comprise indicating which of system state values 68 indicated a fault condition at the particular time of interest 78 if time of interest 78 is within such time span(s). GUI 62 of FIG. 7 may provide an effective visual correlation of faults across different systems 16 of aircraft with system state values 58 and may, in some cases significantly reduce the time needed to conduct diagnostics of aircraft 10 in comparison with existing diagnostics methods.

Figure 8:
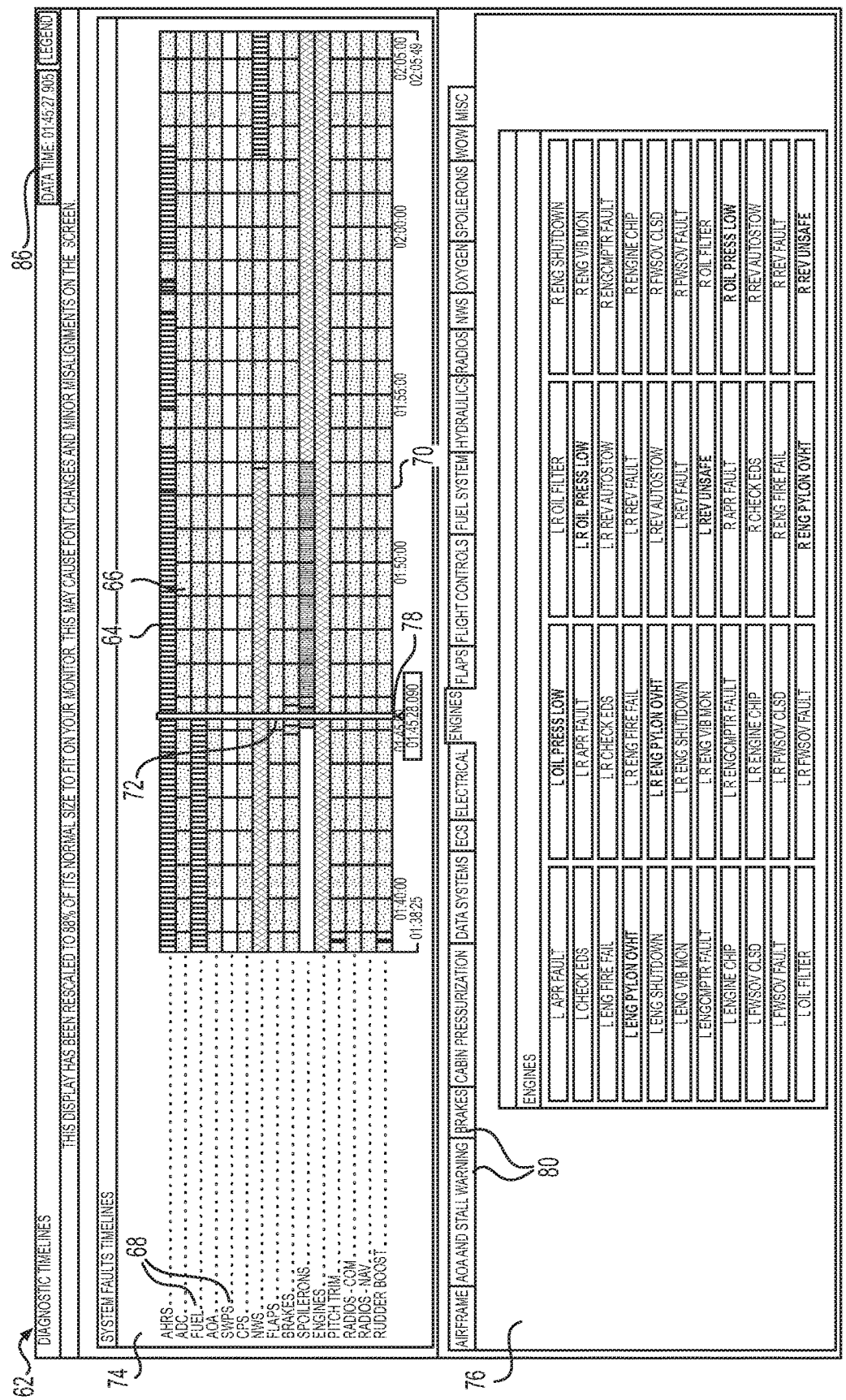

FIG. 8 shows another exemplary GUI 62 that may be generated on display 38 using apparatus 28 and method 600. The information provided in first display region 74 of GUI 62 of FIG. 8 may be substantially identical to that shown in first display region 74 of FIG. 7. However, synchronized status information 50 in FIG. 8 may indicate which alert(s) was/were active at substantially time of interest 78 instead of or in addition to system state values 58. For example, method 600 may comprise receiving input indicating a position (i.e., time of interest 78) along first timeline 64 and/or second timeline 66. Method 600 may also comprise displaying a plurality of potential alerts in second display region 76 of GUI 62 and indicating which of the potential alerts 60 was/were active at substantially time of interest 78. In some embodiments, aspects of the GUIs of FIGS. 7 and 8 could be combined together so that synchronized status information 50 provided in second display region 76 may comprise both active alerts 60 and system state values 58. In FIG. 8, only the identified "L R OIL PRESS LOW" alert is highlighted (i.e., bold letters) and therefore indicated as active at time of interest 78 while the other alerts displayed in the list of potential alerts are not highlighted (i.e., dim letters). GUI 62 of FIG. 8 may provide an effective visual correlation of faults across different systems 16 of aircraft 10 with active alerts 60 and may, in some cases significantly reduce the time needed to conduct diagnostics of aircraft 10 in comparison with existing diagnostics methods.

Figure 9:
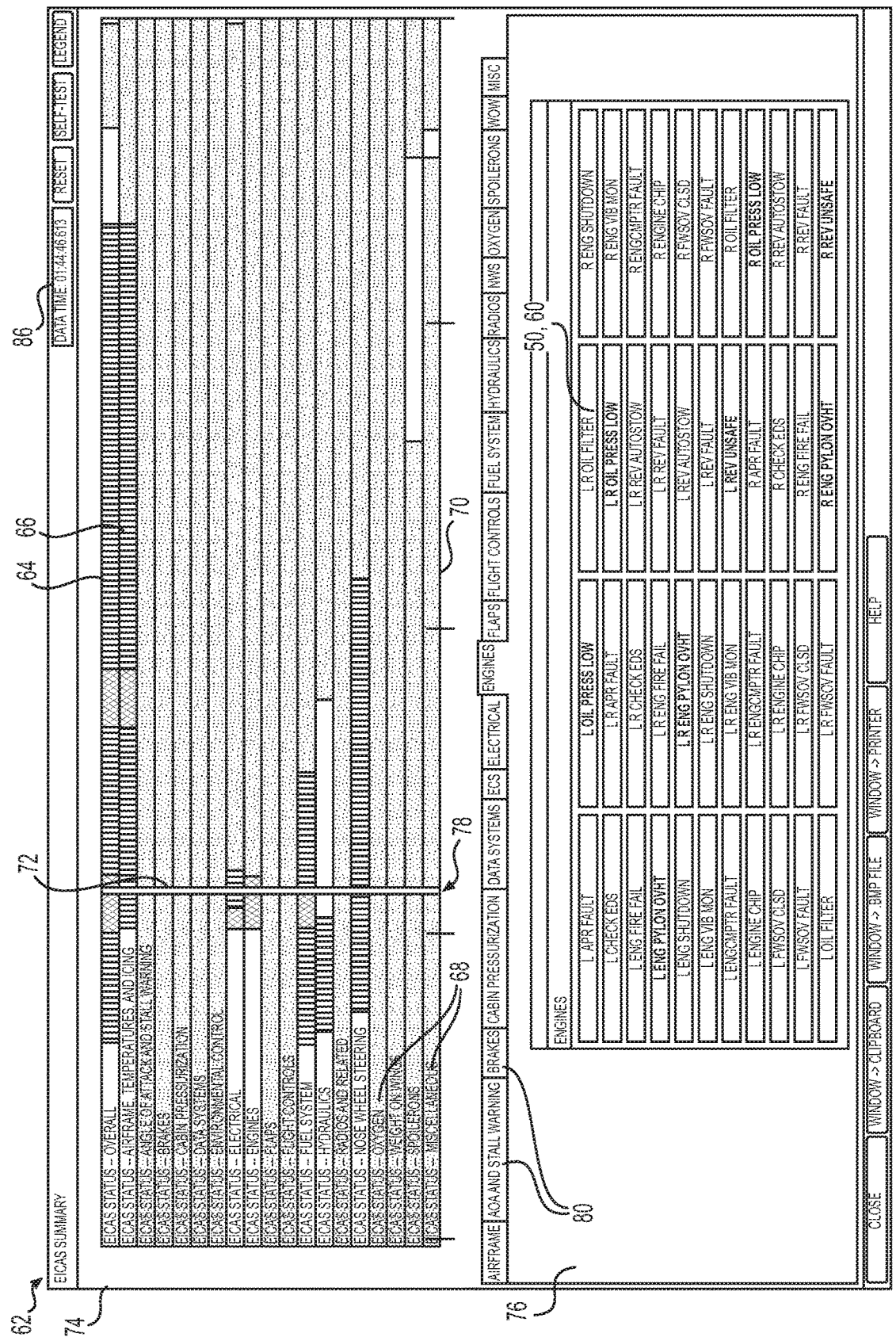

FIG. 9 shows another exemplary GUI 62 that may be generated on display 38 using apparatus 28 and method 600. The information provided in second display region 76 of GUI 62 of FIG. 9 may be substantially identical to that shown in second display region 76 of FIG. 8 and/or second display region 76 of FIG. 7. However, the first status information and the second status information represented along first timeline 64 and second timeline 66 may indicate when one or more alerts were active. First timeline 64 and second timeline 66 may be associated with different systems 16 of aircraft 10. As explained above, synchronized information 50 displayed in second display region 76 may be based on the position of marker 72 along time axis 70. In FIG. 9, an active alert 60 is indicated at time of interest 78 from a list of potential alerts. System state values 58 (see FIG. 7) could be provided in second display region 76 instead of or in addition to alert information. GUI 62 of FIG. 9 may provide an effective visual correlation of alerts across different systems 16 of aircraft 10 with active alerts 60 and may, in some cases significantly reduce the time needed to conduct diagnostics of aircraft 10 in comparison with existing diagnostics methods.

Figure 10:
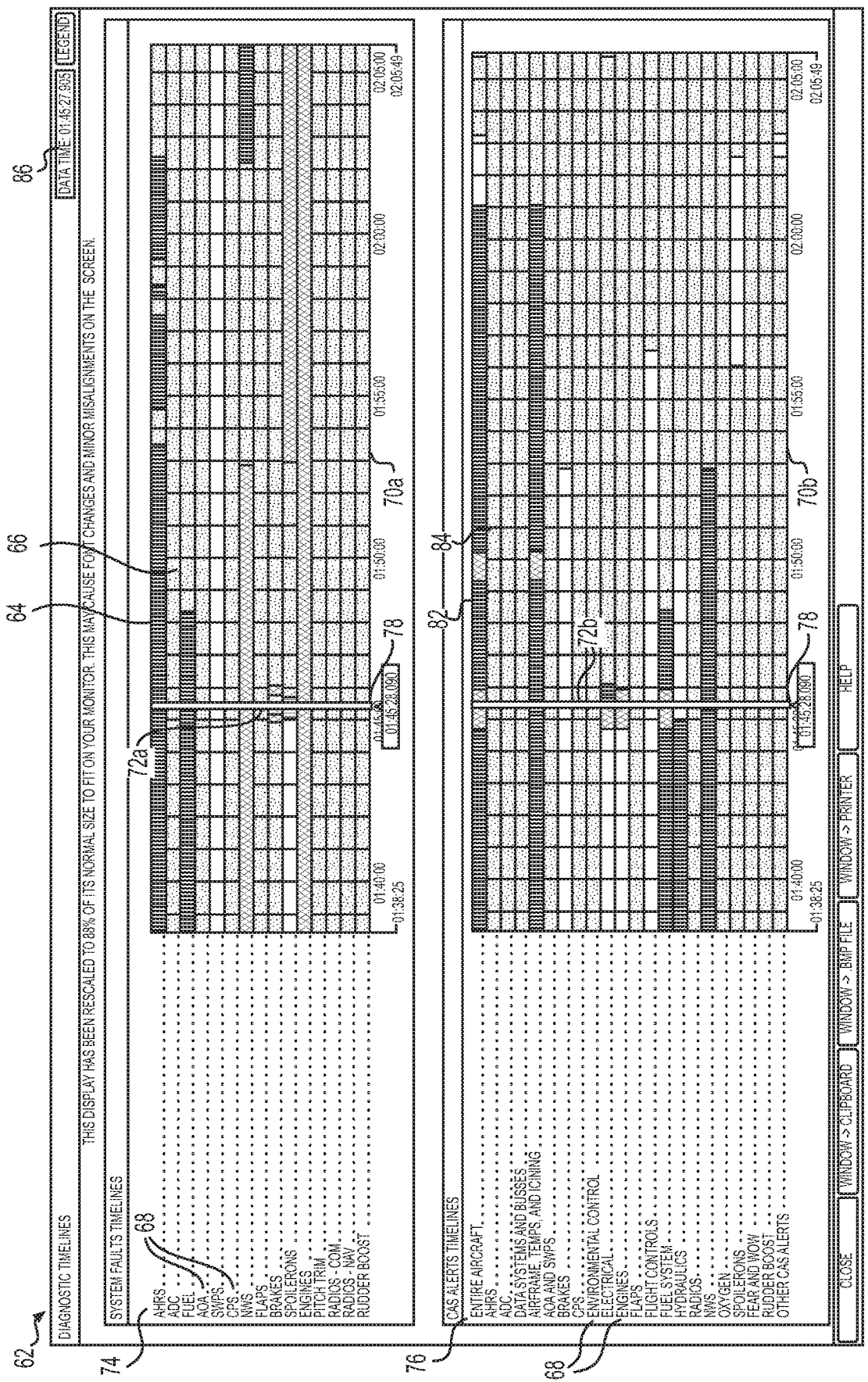

FIG. 10 shows another exemplary GUI 62 that may be generated on display 38 using apparatus 28 and method 600. GUI 62 of FIG. 10 may include first and second timelines 64, 66 of FIG. 7 in first display region 74 and first and second timelines 64, 66 of FIG. 9 in second display region 76. Accordingly, the first status information and the second status information respectively represented along first timeline 64 and second timeline 66 may indicate when one or more faults were active for a first system 16 and a second system 16. Method 600 may comprise receiving data associated with the operation of aircraft 10 where the data comprises third status information of aircraft 10 correlated with time and fourth status information of aircraft 10 correlated with time. The third status information and the fourth status information may respectively indicate when an alert was active for the first system 16 and the second system 16. Method 600 may comprise synchronizing the third status information and the fourth status information with the first status information and the second status information. Such synchronization may comprise identifying the third status information and the fourth status information in the period of time comprising time of interest 78. Method 600 may also comprise providing, in GUI 62 of FIG. 10, third timeline 82 along which the third status information is represented over the same period of time and fourth timeline 84 along which the fourth status information is represented over the same period of time.

First, second, third and fourth timelines 64, 66, 82 and 84 may be juxtaposed next to each other so that they may be visible simultaneously on GUI 62 and may be visually compared to each other by a user of apparatus 28. As shown in FIG. 10, additional timelines may be provided in first display region 74 in addition to first timeline 64 and second timeline 66. Similarly, additional timelines may be provided in second display region 76 in addition to third timeline 82 and fourth timeline 84. Alternatively, first, second, third and fourth timelines 64, 66, 82 and 84 may be provide in the same display region 74 or 76 of GUI 62. As explained above different colours may be provided along first, second, third and fourth timelines 64, 66, 82 and 84 to represent different values of the first, second, third and fourth status information respectively.

First marker 72A may be provided in first display region 74 of GUI 62. First marker 72A may superimpose first timeline 64 and second timeline 66. Movement of first marker 72A may be controlled by a user via input device 40 (see FIG. 1) and may be limited to movement along time axis 70A. Similarly, second marker 72B may be provided in second display region 76 of GUI 62. Second marker 72B may superimpose third timeline 82 and fourth timeline 84. Movement of second marker 72B may be controlled by a user via input device 40 and may be limited to movement along time axis 70B. Upon receiving an input indicative of movement of one of first marker 72A and second marker 72B, method 600 may cause synchronized movement of both first marker 72A and second marker 72B based on the input received. Alternatively a single marker may superimposed over first, second, third and fourth timelines 64, 66, 82 and 84. In any event, GUI 62 of FIG. 10 may provide an effective visual correlation of faults across different systems 16 of aircraft 10 with alerts across different systems 16 of aircraft 10 and may, in some cases significantly reduce the time needed to conduct diagnostics of aircraft 10 in comparison with existing diagnostics methods.

Figure 11:
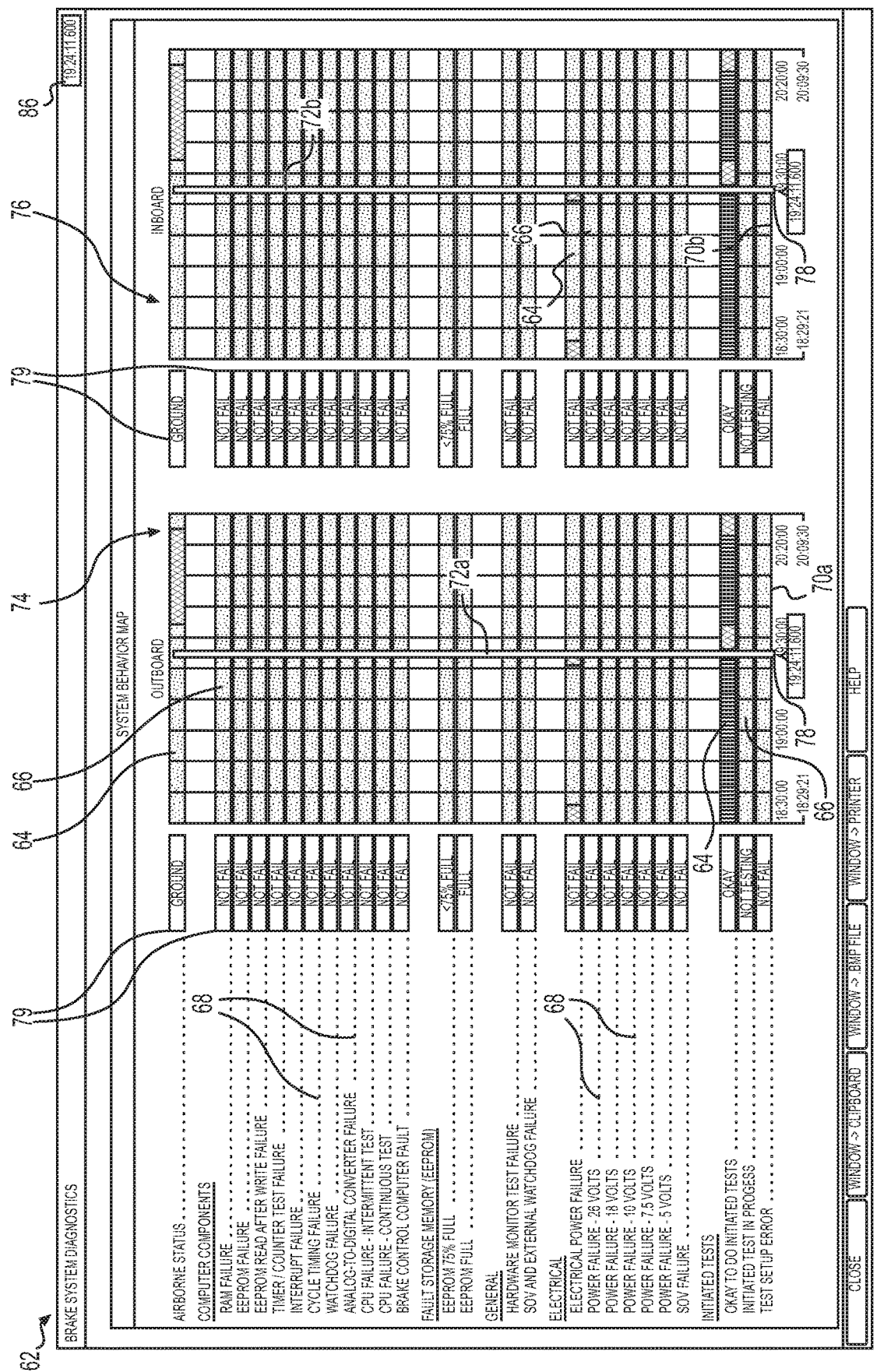

FIG. 11 shows another exemplary GUI 62 that may be generated on display 38 using apparatus 28 and method 600. GUI 62 of FIG. 11 may contain elements similar to or identical to elements described above in relation to other GUI's and such elements have been identified in FIG. 11 using like reference numerals. Accordingly, a detailed description of such elements is not repeated below. GUI 62 of FIG. 11 may include a plurality of timelines such as first and second timelines 64, 66 in first display region 74 and also in second display region 76. GUI 62 of FIG. 11 may contain fewer or more display regions 74, 76 than those illustrated. The first status information and the second status information respectively represented along first timeline 64 and second timeline 66 may indicate when one or more faults were active for a common system 16 (i.e., brakes). GUI 62 of FIG. 11 may provide an overview of a plurality or all possible (i.e., potential) faults associated with a single or more systems 16 along with an indication of when they were active and how severe they were. GUI 62 of FIG. 11 may give a technician an understanding of the sequence and duration of faults within a specific system 16, leading to an improved understanding of what went wrong, when, and in what order. First display region 74 may be used for displaying timelines 64, 66 associated with a subsystem (e.g., outboard brakes) of system 16 and second display region 76 may be used for displaying timelines 64, 66 associated with another subsystem (e.g., inboard brakes) of system 16.

As explained in relation to other GUI's 62, the first status information and the second status information represented by timeline 64, 66 may also be synchronized so that the status information represented by timelines 64 and 66 may be from a period of time comprising time of interest 78. Some of the timelines (e.g., 64, 66) may be juxtaposed next to each other so that they may be visible simultaneously on GUI 62 and may be visually compared to each other by a user of apparatus 28. Different colours may be provided along timelines 64, 66 to represent different values of the status information. GUI 62 of FIG. 11 may comprise a status indicator 79 associated with a respective one or more timelines 64, 66 indicating a value of the status information 50 represented by the respective timeline 64, 66 at the time of interest 78 indicated by marker 72.

Figure 12:
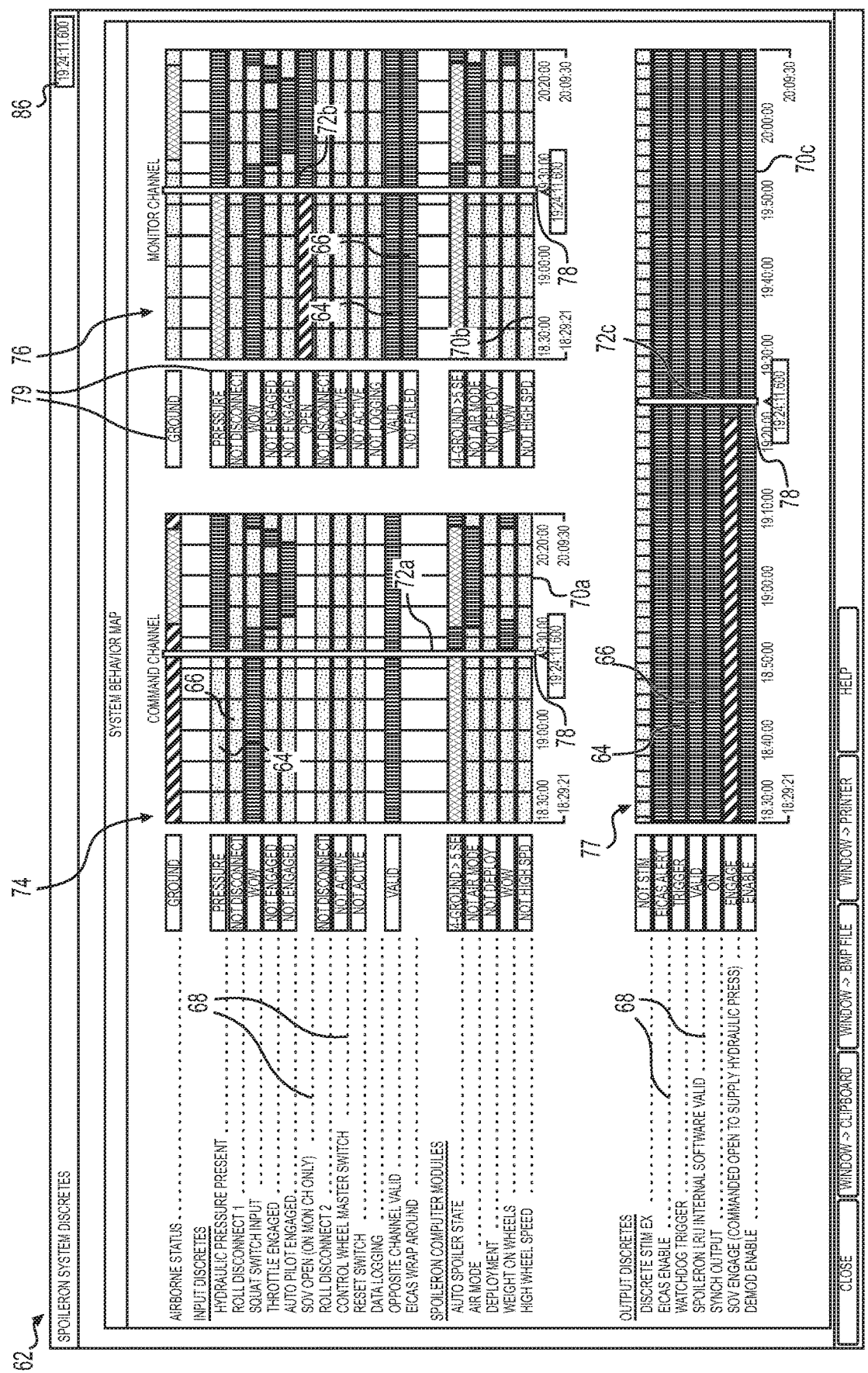

FIG. 12 shows another exemplary GUI 62 that may be generated on display 38 using apparatus 28 and method 600. GUI 62 of FIG. 12 may contain elements similar to or identical to elements described above in relation to other GUI's and such elements have been identified in FIG. 12 using like reference numerals. Accordingly, a detailed description of such elements is not repeated below. GUI 62 of FIG. 12 may include a plurality of timelines such as first and second timelines 64, 66 in first display region 74, in second display region 76 and in third display region 77. GUI 62 of FIG. 12 may contain fewer or more display regions 74, 76, 77 than those illustrated. The first status information and the second status information respectively represented along first timeline 64 and second timeline 66 may indicate system state values 58. Such system state values 58 may represent operational states of the system(s) in question instead of faults and may include those commonly known as "discretes", which always assume one of a clearly defined set of possible values. GUI 62 of FIG. 12 may provide an overview of a plurality or all system state values 58 associated with a single or more systems 16 (e.g., spoileron) along with an indication of their respective status with respect to time.

GUI 62 of FIG. 12 may give a technician an understanding of how a specific system's state values 58 changed over time and help pinpoint causal chains at a glance. This could also lead to an improved understanding of what went wrong, when, and in what order. First display region 74 may, for example, be used for displaying timelines 64, 66 of input discretes associated with a command channel of a system 16 and second display region 76 may be used for displaying timelines 64, 66 of input discretes associated with a monitoring channel of the same system 16. Third display region 77 may, for example, be used for displaying timelines 64, 66 of output discretes associated with the same system 16.

As explained in relation to other GUI's 62, the first status information and the second status information represented by timeline 64, 66 may also be synchronized so that the status information represented by timelines 64 and 66 may be from a period of time comprising a time of interest 78 along a time axis 70a, 70b, 70c. Some of the timelines (e.g., 64, 66) may be juxtaposed next to each other so that they may be visible simultaneously on GUI 62 and may be visually compared to each other by a user of apparatus 28. Different colours may be provided along timelines 64, 66 to represent different values of the status information. GUI 62 of FIG. 12 may comprise a status indicator 79 associated with a respective one or more timelines 64, 66 indicating a value of the status information 50 represented by the respective timeline 64, 66 at the time of interest 78 indicated by marker 72 (72A-72C).

Figure 13:
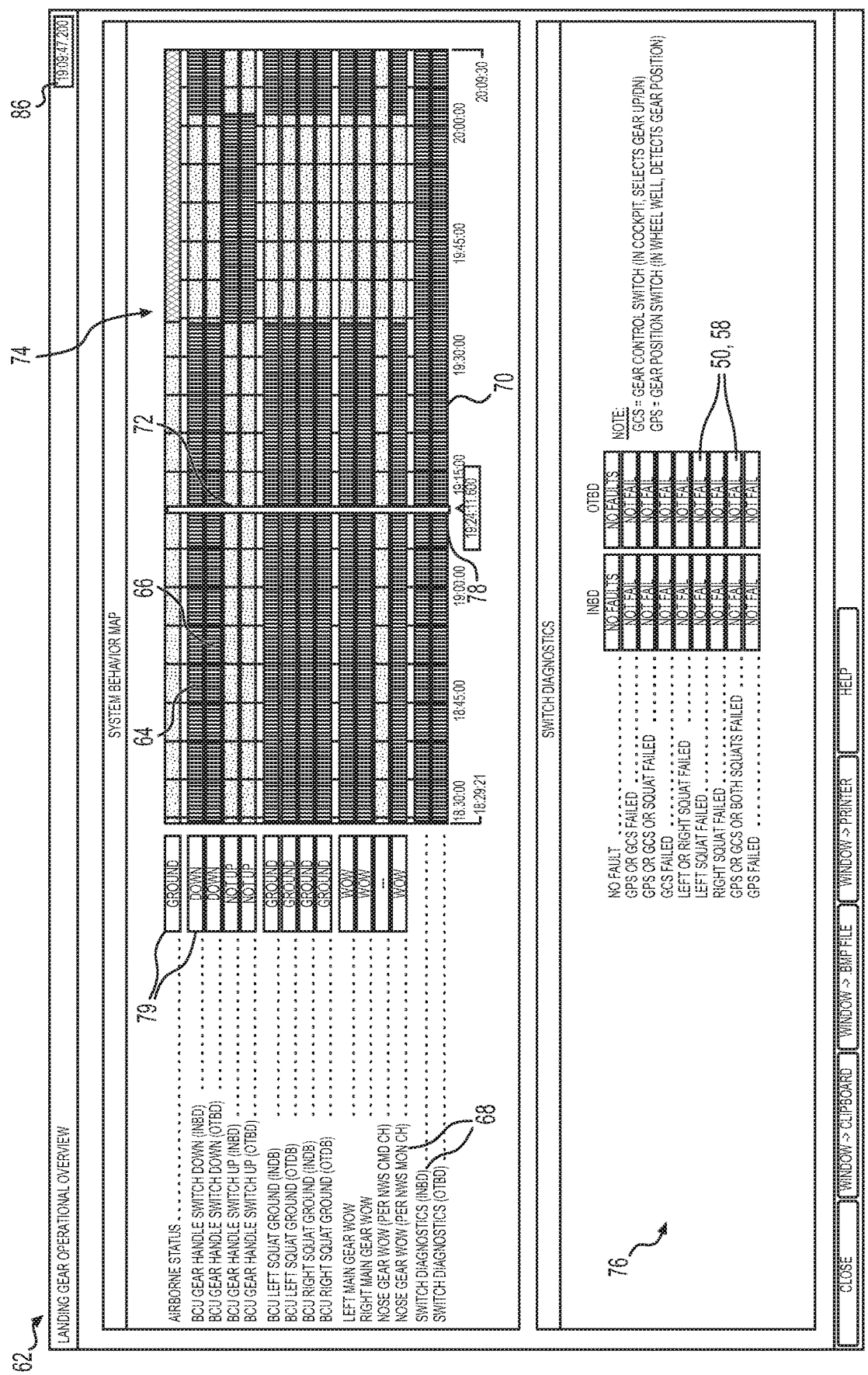

FIG. 13 shows another exemplary GUI 62 that may be generated on display 38 using apparatus 28 and method 600. GUI 62 of FIG. 13 may contain elements similar to or identical to elements described above in relation to other GUI's and such elements have been identified in FIG. 13 using like reference numerals. Accordingly, a detailed description of such elements is not repeated below. GUI 62 of FIG. 13 may include a plurality of timelines such as first and second timelines 64, 66 in first display region 74. The first status information and the second status information respectively represented along first timeline 64 and second timeline 66 may indicate system state values (e.g., "discretes") associated with a single or more systems 16 (e.g., landing gear) along with an indication of their respective status with respect to time.

GUI 62 of FIG. 13 may comprise second display region 76 separate from first display region 74 so that second display region 76 does not overlap first display region 74. Second display region 76 may serve to display synchronized status information 50 (e.g., state values 58) based on the position of marker 72. System state values 58 displayed in GUI 62 may be synchronized with the status information 50 represented in first timeline 64 and/or second timeline 66 based on the position along first timeline 64 and/or second timeline 66 indicated by marker 72.

GUI 62 of FIG. 13 may give a technician an understanding of how a specific system's state values 58 changed over time and help pinpoint causal chains at a glance. This could also lead to an improved understanding of what went wrong, when, and in what order. As explained in relation to other GUI's 62, the first status information and the second status information represented by timeline 64, 66 may also be synchronized so that the status information represented by timelines 64 and 66 may be from a period of time comprising time of interest 78. Some of the timelines (e.g., 64, 66) may be juxtaposed next to each other so that they may be visible simultaneously on GUI 62 and may be visually compared to each other by a user of apparatus 28. Different colours may be provided along timelines 64, 66 to represent different values of the status information. GUI 62 of FIG. 13 may comprise a status indicator 79 associated with a respective one or more timelines 64, 66 indicating a value of the status information 50 represented by the respective timeline 64, 66 at the time of interest 78 indicated by marker 72.

FIGS. 14A and 14B illustrates the function of time selector 86 which may be used in one or more of the GUIs 42, 62 shown and/or described herein. In various embodiments, time selector 86 may be used to control the movement of markers 52 or 72 via input device 40. For example, time selector 86 may comprise display area 87 in which time of interest 46C, 78 indicated by marker 52, 72 may be displayed. Time selector 86 may be operated by a user of apparatus 28 via cursor 88. The movement of cursor 88 may be controlled by the user via input device 40. Time selector 86 may, for example, be operated by the user positioning cursor 88 over display area 87 and selecting time selector 86 by actuating a button or key such as a mouse button or an "ENTER" key on a keyboard. Movement of marker 52, 72 may then be controlled by moving cursor 88 along the horizontal direction H and/or the vertical direction V. Left movement of cursor 88 may correspondingly cause movement of marker 52, 72 toward the left (e.g., back in time) along time axis 46A, 70 and right movement of cursor 88 may correspondingly cause movement of marker 52, 72 toward the right (e.g., forward in time) along time axis 46A, 70.

The sensitivity of time selector 86 may be varied in order to control the speed of movement of marker 52, 72 along time axis 46A, 70. In some embodiments, as illustrated in FIGS. 14A and 14B, the sensitivity of time selector 86 may be a function of (e.g., proportional to) the vertical position of cursor 88 from display area 87 when horizontal movement of cursor 88 is made. For example, positioning cursor 88 above display area 87 may result in faster (i.e., coarser) movement of marker 52, 72 along time axis 46A, 70 when cursor 88 is subsequently moved horizontally and positioning cursor 88 below display area 87 may result in slower (i.e., finer) movement of marker 52, 72 along time axis 46A, 70 when cursor 88 is subsequently moved horizontally.

Time selector 86 may also provide an indication of which portion of the data received from aircraft 10 is displayed along time axis 46A, 70. For example, only a subset of the data may be displayed along time axis 46A, 70 and time selector may comprise indicator 90, which indicates which portion of the data set is displayed along time axis 46A, 70 by way of its relative horizontal position within display area 87. In some embodiments, movement of indicator 90 toward the left may indicate movement toward the beginning of the data set (e.g., earlier in time) and movement of indicator 90 toward the right may indicate movement toward the end of the data set (e.g., later in time).

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, devices, apparatus and methods disclosed and shown herein may comprise a specific number of elements/components, the systems, devices apparatus and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A computer-implemented method for conducting diagnostics of a mobile platform comprising two or more different systems, the method comprising:
   receiving data associated with operation of the mobile platform, the data comprising a parameter of the mobile platform correlated with time and status information of the mobile platform correlated with time;
   processing the data and generating a graphic user interface on a display device, the graphic user interface comprising a first display region showing a two-dimensional graph of the parameter plotted against a time axis and a second display region separate from the first display region;
   receiving input indicative of a time of interest along the time axis of the two-dimensional graph;
   using the status information and the time of interest along the time axis of the two-dimensional graph, identifying status information synchronized with the plotted parameter at the time of interest;
   providing the synchronized status information in the second display region separate from the first display region;
   identifying a fault based on the data;
   providing a fault timeline plotted against the time axis of the two-dimensional graph of the first display region indicating a time span during which the fault was active; and
   when the time of interest is within the time span during which the fault was active, indicating which of a plurality of system state values is associated with the fault at the time of interest;
   wherein the synchronized status information displayed in the second display region comprises the plurality of system state values, and
   wherein the plurality of system state values is from the two or more different systems.

2. The method as defined in claim 1, comprising:
   identifying a fault associated with the synchronized status information; and
   providing, in addition to the synchronized status information, an indication of the fault in the second display region.

3. The method as defined in claim 1, further comprising:
   providing, in addition to the synchronized status information, an indication of the fault in the second display region when the time of interest is within the time span during which the fault was active.

4. The method as defined in claim 1, further comprising:
   providing a first color on the fault timeline to indicate when the fault was active and providing a second color on the fault timeline to indicate when no faults were active.

5. The method as defined in claim 1, further comprising:
   identifying an active alert based on the data; and
   providing an alert timeline plotted against the time axis of the two-dimensional graph of the first display region indicating a time span during which the alert was active.

6. The method as defined in claim 5, wherein:
   the synchronized status information displayed in the second display region comprises a plurality of potential alerts; and
   the method further comprises, when the time of interest is within the time span during which the alert was active, indicating which of the potential alerts was active at the time of interest.

7. The method as defined in claim 5, further comprising:
   providing a first color on the alert timeline to indicate when the alert was active and providing a second color on the alert timeline to indicate when no alerts were active.

8. The method as defined in claim 1, wherein the parameter and the synchronized status information are related to a same system of the mobile platform.

9. The method as defined in claim 1, further comprising:
   providing a marker on the first display region;
   wherein the input indicative of the time of interest is based on a position of the marker; and
   wherein at least part of the marker has an elongated portion extending parallel to an ordinate of the two-dimensional plot and movement of the marker is limited to movement along the time axis of the two-dimensional plot.

10. An apparatus for conducting diagnostics of a mobile platform comprising two or more different systems, the apparatus comprising:
    a display device;
    a data processor coupled to the display device; and
    a non-transitory computer-readable medium containing data associated with operation of the mobile platform, the data comprising a parameter of the mobile platform correlated with time and status information of the mobile platform correlated with time, the computer-readable medium also containing instructions readable and executable by the data processor to perform a method comprising
       processing the data and generating a graphic user interface on the display device, the graphic user interface comprising a first display region showing a two-dimensional graph of the parameter plotted against a time axis and a second display region separate from the first display region;
       receiving input indicative of a time of interest along the time axis of the two-dimensional graph;
       using the status information and the time of interest along the time axis of the two-dimensional graph, identifying status information synchronized with the plotted parameter at the time of interest;
       providing the synchronized status information in the second display region separate from the first display region;
       identifying a fault based on the data;
       providing a fault timeline plotted against the time axis of the two-dimensional graph of the first display region indicating a time span during which the fault was active; and
       when the time of interest is within the time span during which the fault was active, indicating which of a plurality of system state values is associated with the fault at the time of interest;
       wherein the synchronized status information displayed in the second display region comprises the plurality of system state values, and
       wherein the plurality of system state values is from two or more different systems.

11. The apparatus as defined in claim 10, wherein the method performed based on the instructions comprises:
    identifying a fault associated with the synchronized status information; and
    providing, in addition to the synchronized status information, an indication of the fault in the second display region.

12. The apparatus as defined in claim 10, wherein the method performed based on the instructions further comprises:
    providing, in addition to the synchronized status information, an indication of the fault in the second display region when the time of interest is within the time span during which the fault was active.

13. The apparatus as defined in claim 10, wherein the method performed based on the instructions further comprises:
    providing a first color on the fault timeline to indicate when the fault was active and providing a second color on the fault timeline to indicate when no faults were active.

14. The apparatus as defined in claim 10, wherein the method performed based on the instructions further comprises:
    identifying an active alert based on the data; and
    providing an alert timeline plotted against the time axis of the two-dimensional graph of the first display region indicating a time span during which the alert was active.

15. The apparatus as defined in claim 14, wherein:
    the synchronized status information displayed in the second display region comprises a plurality of potential alerts; and
    the method performed based on the instructions further comprises, when the time of interest is within the time span during which the alert was active, indicating which of the potential alerts was active at the time of interest.

16. The apparatus as defined in claim 14, wherein the method performed based on the instructions further comprises:
    providing a first color on the alert timeline to indicate when the alert was active and providing a second color on the alert timeline to indicate when no alerts were active.

17. The apparatus as defined in claim 10, wherein the parameter and the synchronized status information are related to a same system of the mobile platform.

18. The apparatus as defined in claim 10, wherein:
    the method performed based on the instructions further comprises providing a marker on the first display region;
    the input indicative of the time of interest is based on a position of the marker; and
    at least part of the marker has an elongated portion extending parallel to an ordinate of the two-dimensional plot and movement of the marker is limited to movement along the time axis of the two-dimensional plot.

19. A computer-implemented method for conducting diagnostics of a mobile platform, the method comprising:
    receiving data associated with operation of the mobile platform, the data comprising (i) a parameter of a first system of the mobile platform correlated with time; and (ii) status information related to a second system, different than the first system, of the mobile platform correlated with time;
    processing the data and generating a graphic user interface on a display device, the graphic user interface comprising a first display region showing a two-dimensional graph of the parameter plotted against a time axis and a second display region separate from the first display region;
    receiving input indicative of a time of interest along the time axis of the two-dimensional graph;
    using the status information related to the second system and the time of interest along the time axis of the two-dimensional graph, identifying status information synchronized with the plotted parameter of the first system at the time of interest; and
    providing the synchronized status information related to the second system in the second display region separate from the first display region.

* * * * *